US 6,688,964 B2

(12) United States Patent
Uemura et al.

(10) Patent No.: US 6,688,964 B2
(45) Date of Patent: Feb. 10, 2004

(54) AIR PASSAGE OPENING/CLOSING DEVICE AND VEHICLE AIR CONDITIONER USING THE SAME

(75) Inventors: Yukio Uemura, Nagoya (JP); Tomohide Shindo, Kariya (JP); Koji Ito, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/386,278

(22) Filed: Mar. 11, 2003

(65) Prior Publication Data
US 2003/0171091 A1 Sep. 11, 2003

(30) Foreign Application Priority Data

Mar. 11, 2002 (JP) ........................................ 2002-065458
Feb. 4, 2003 (JP) ........................................ 2003-027048

(51) Int. Cl.[7] ................................................. B60S 1/58
(52) U.S. Cl. ....................................... 454/121; 454/156
(58) Field of Search ............................... 454/121, 156, 454/126, 160, 161; 251/901

(56) References Cited

U.S. PATENT DOCUMENTS 5,653,630 A * 8/1997 Higashihara ................. 454/121
6,273,811 B1 * 8/2001 Pawlak, III .................. 454/156
6,569,009 B2 * 5/2003 Nishikawa et al. .......... 454/121
6,612,922 B2 * 9/2003 Uemura et al. .............. 454/121

FOREIGN PATENT DOCUMENTS

| JP | U-3-1812 | 1/1991 |
| JP | A-8-2238 | 1/1996 |
| JP | B2-2526854 | 6/1996 |
| JP | A-11-5430 | 1/1999 |

* cited by examiner

Primary Examiner—Jiping Lu
(74) Attorney, Agent, or Firm—Harness, Dickey & Pierce, PLC

(57) ABSTRACT

In an air passage opening/closing device for an air conditioner, a slide door for opening and closing an opening portion of a case includes a flexible film member having a free top end that moves forward by pushing force in a door moving direction. A movement of the film member is guided along a guide ditch. The guide ditch is provided so that the film member is approached to a seal surface in a direction perpendicular to a door moving direction, in comparison with the other seal surface on a peripheral portion of the opening portion. For example, a pushing member for pushing the film member to the seal surface in the direction perpendicular to the door moving direction can be provided. Accordingly, air leakage due to a bending habit of the film member can be restricted.

22 Claims, 16 Drawing Sheets

AIR PASSAGE OPENING/CLOSING DEVICE AND VEHICLE AIR CONDITIONER USING THE SAME

CROSS REFERENCE TO RELATED APPLICATION

This application is based upon and claims the benefit of Japanese Patent Applications No. 2002-65458 filed on Mar. 11, 2002, and No. 2003-27048 filed on Feb. 4, 2003, the content of which is incorporated herein by reference.

BACKGROUND OF THE INVENTION

1. Field of the Invention

This invention relates to an air passage opening/closing device for opening and closing an air passage by moving a slide door including a flexible film member, and relates to a vehicle air conditioner using the air passage opening/closing device.

2. Description of the Related Art

An air passage opening/closing device for switching an air passage by movement of a film member is described in JP-A-8-2238. In this device, both ends of a film member are attached to a driving shaft and a driven shaft (following shaft) rotatably mounted in an air-conditioning case, and the film member is moved by using a winding mechanism of the driving and driven shafts. Therefore, the driving and driven shafts are required to be operatively linked with each other, and an interlock mechanism such as a pulley and a wire is required. As a result, the number of components of the device is increased, and its assemble process is complicated, thereby increasing its production cost.

However, when the winding mechanism is simply not provided, and a moving end of the film member is made free, it is difficult to prevent an air leakage. Further, in this case, deformation of the film member is readily caused due to bending habit of the free end or the gravity of the film member.

SUMMARY OF THE INVENTION

It is an object of the present invention to prevent air leakage due to a bending habit or gravity of a flexible film member, in an air passage opening/closing device for opening and closing an opening portion of an air passage, using a slide door including the flexible film member.

According to the present invention, an air passage opening/closing device includes a case for defining an opening portion of an air passage through which air flows, a slide door disposed in the case to be movable in a door moving direction for opening and closing the opening portion, a driving device for moving the slide door, a guide member provided in the case for defining a guide ditch for guiding a movement of a flexible film member, and a pushing member that pushes the film member toward a seal surface around the opening portion of the case. The flexible film member is disposed at an upstream side of the opening portion in an air flow direction, and the film member has a free top end in the door moving direction. Further, the free top end of the film member is moved forward along the guide ditch by a pushing force from the driving device to the film member. On the other hand, the seal surface of the case has a first surface in a direction parallel to the door moving direction, and a second surface in a direction perpendicular to the door moving direction. In the air passage opening/closing device, the pushing member is disposed to push the film member toward the second surface such that a clearance between the film member and the second surface becomes smaller than a clearance between the film member and first surface. Accordingly, even when the film member is deformed due to a bending habit and gravity, because the film member is pushed by the pushing member to the second surface in the seal surface, the film member can be forcibly approached to the second surface in the seal surface of a peripheral portion of the opening portion. Therefore, air leakage caused by the deformation of the film member due to the bending habit and the gravity of the film member can be effectively restricted.

Preferably, the pushing member is disposed in the slide door partially at least in a center area of the slide door in the direction perpendicular to the door moving direction. In this case, it can restrict a sliding area between the pushing member and the film member from being increased, while a clearance between the film member and the second surface can be reduced in the center area in the direction perpendicular to the door moving direction. Therefore, door operation force for operating the slide door can be reduced, and the air leakage can be effectively restricted. However, the pushing member can be disposed in the slide door in an entire length of the slide door in the direction perpendicular to the door moving direction. In this case, the film member can be approached to the seal surface along the entire length in the direction perpendicular to the door moving direction, and the air leakage can be further restricted.

In the present invention, the pushing member can be provided integrally with the guiding member. In this case, the pushing member can be provided in the guide member to be offset from a wall surface of the guide member toward the second surface in the seal surface, at a portion around the second surface. Alternatively, the pushing member can be disposed on a wall surface of the guide member defining the guide ditch, to reduce partially a ditch dimension in an area around the second surface. Even in this case, the air leakage can be effectively restricted.

Further, in the present invention, the guide ditch is provided such that the clearance between the film member and the second surface of the case is made smaller than the clearance between the film member and the first surface of the case, without providing the special pushing member. Even in this case, the air leakage caused by the deformation of film member due to the being habit and the gravity of the film member can be effectively restricted.

The air passage opening/closing device of the present invention can be suitably used for a vehicle air conditioner. For example, the slide door can be used as an air mixing door that adjusts a flow ratio between an air amount passing through a heater core and an air amount passing through a bypass passage while bypassing the heater core in the case. Alternatively, the slide door can be used as an air outlet mode-switching door for switching an air outlet mode such as a face mode, a foot mode, a foot-defroster mode and a defroster mode, in a vehicle air conditioner.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF THE PREFERRED EMBODIMENTS

Figure 1:
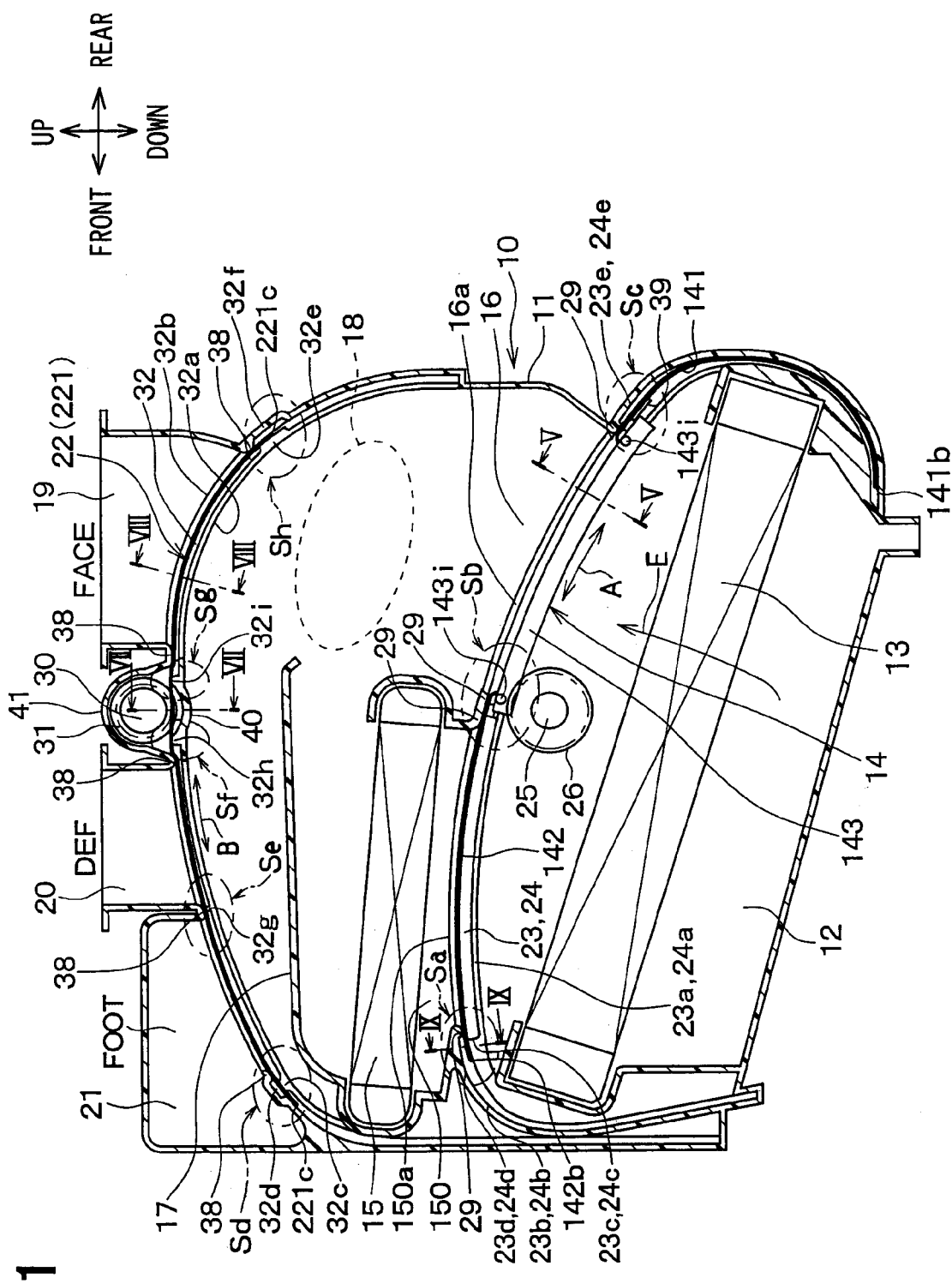
FIG. 1 is a schematic sectional view showing an air-conditioning unit of a vehicle air conditioner according to a first preferred embodiment of the present invention.

Preferred embodiments of the present invention will be now described with reference to the appended drawings.

(First Embodiment)

In the first embodiment, the present invention is typically applied to a vehicle air conditioner. The vehicle air conditioner according to the first embodiment includes an air-conditioning unit 10 shown in FIG. 1, and a blower unit (not shown). FIG. 2 is an enlarged view showing a main part of the present invention in FIG. 1. The air-conditioning unit 10 is disposed inside a dashboard (not shown) on a front side in a passenger compartment, and at an approximate center in a right-left (width) direction of the vehicle. The air-conditioning unit 10 is mounted on the vehicle to correspond to the arrangement state in FIG. 1 in the vehicle up-down direction and the vehicle front-rear direction. Further, the blower unit (not shown) is disposed inside the dashboard at a position offset toward a front passenger's seat side from the air conditioning unit 10 in the vehicle right-left direction.

The blower unit includes an inside-outside air switching box and a blower. The switching box switches and introduces any one of outside air (i.e., air outside the passenger compartment) and inside air (i.e., air inside the passenger compartment), and the blower blows air introduced from the switching box toward the air conditioning unit 10. Air blown by the blower unit flows into an air inlet space 12 provided at a lowest portion in an air-conditioning case 11 of the air-conditioning unit 10. The air-conditioning case 11 is formed from a resin, such as polypropylene (PP), which is flexible and is mechanically strong. The air-conditioning case 11 is formed by plural separated case parts, so that die removal can be conveniently performed, and air-conditioning apparatuses such as doors and heat exchangers can be conveniently attached to the air-conditioning case 11. After the air-conditioning apparatus are assembled, the plural separated case members are integrally connected to each other. In the present example, the air-conditioning case 11 is separated to right and left case parts at an approximate center of the air-conditioning case 11 in the vehicle right-left direction.

An evaporator 13 used as a cooling heat exchanger for cooling air is disposed at an upper side from the air inlet space 12 in the air-conditioning case 11 of the air-conditioning unit 10 to be slightly tilted with respect to a horizontal direction. Accordingly, air blown by the blower unit flows into the air inlet space 12, and thereafter passes through the evaporator 13 upwardly from the air inlet space 12. The evaporator 13 constructs a part of a refrigerant cycle for the vehicle air conditioner. In the refrigerant cycle, refrigerant is decompressed to be low-pressure refrigerant by a decompression device such as an expansion valve, and the low-pressure refrigerant flows into the evaporator 13. Refrigerant is evaporated in the evaporator 13 by absorbing heat from air passing through the evaporator 13, so that air passing through the evaporator 13 is cooled. An air-mixing slide door 14 including a film member is disposed at an upper side (downstream air side) of the evaporator 13, and a hot-water heater core 15 is disposed at an upper side (downstream air side) of the slide door 14. The heater core 15 is a heating heat exchanger for heating air by using hot water (cooling water) from a vehicle engine as a heat source. The heater core 15 is disposed substantially horizontally in the air-conditioning case 11. Further, an air passage area of the heater core 15 is made smaller than that in the air-conditioning case 11, and the heater core 15 is disposed at a position offset toward the front side in the vehicle front-rear direction. Therefore, a cool air passage 16, through which cool air from the evaporator 13 flows while bypassing the heater core 15, is provided at the rear side of the heater core 15 in the air conditioning case 1.

The slide door 14 moves at a position between the evaporator 13 and the heater core 15, in the vehicle front-rear direction (door moving direction) A. Thus, the slide door 14 adjusts a flow amount ratio between cool air passing through the cool air passage 16 and warm air passing through an air passage of the heater core 15, that is, a warm air passage 150. Accordingly, the slide door 14 adjusts a temperature of air to be blown into the passenger compartment, and uses as a temperature adjustment device of air to be blown into the passenger compartment. The warm air passing through the heater core 15 is guided to a vehicle rear side by a warm-air guide wall 17, and flows to an air mixing portion 18. The warm air passing through the heater core 15 and the cool air from the cool air passage 16 are mixed to each other in the air mixing portion 18, so that conditioned air having a desired temperature can be obtained.

A face port 19, a defroster port 20 and a foot port 21 are provided as air outlet ports on an upper surface portion (downstream air end portion) of the air-conditioning case 11 in this order in a direction from the vehicle rear side to the vehicle front side. Conditioned air from the air mixing portion 18 is blown from the face port 19 toward the upper half body of a passenger. The conditioned air is blown from the defroster port 20 toward an inner surface of a windshield, and is blown from the foot port 21 toward the foot portion of the passenger. An outlet mode-switching slide door 22 including a film member moves in the vehicle front-rear direction (door moving direction B), thereby selectively opening and closing the plural air outlet ports 19, 20, 21.

Figure 2:
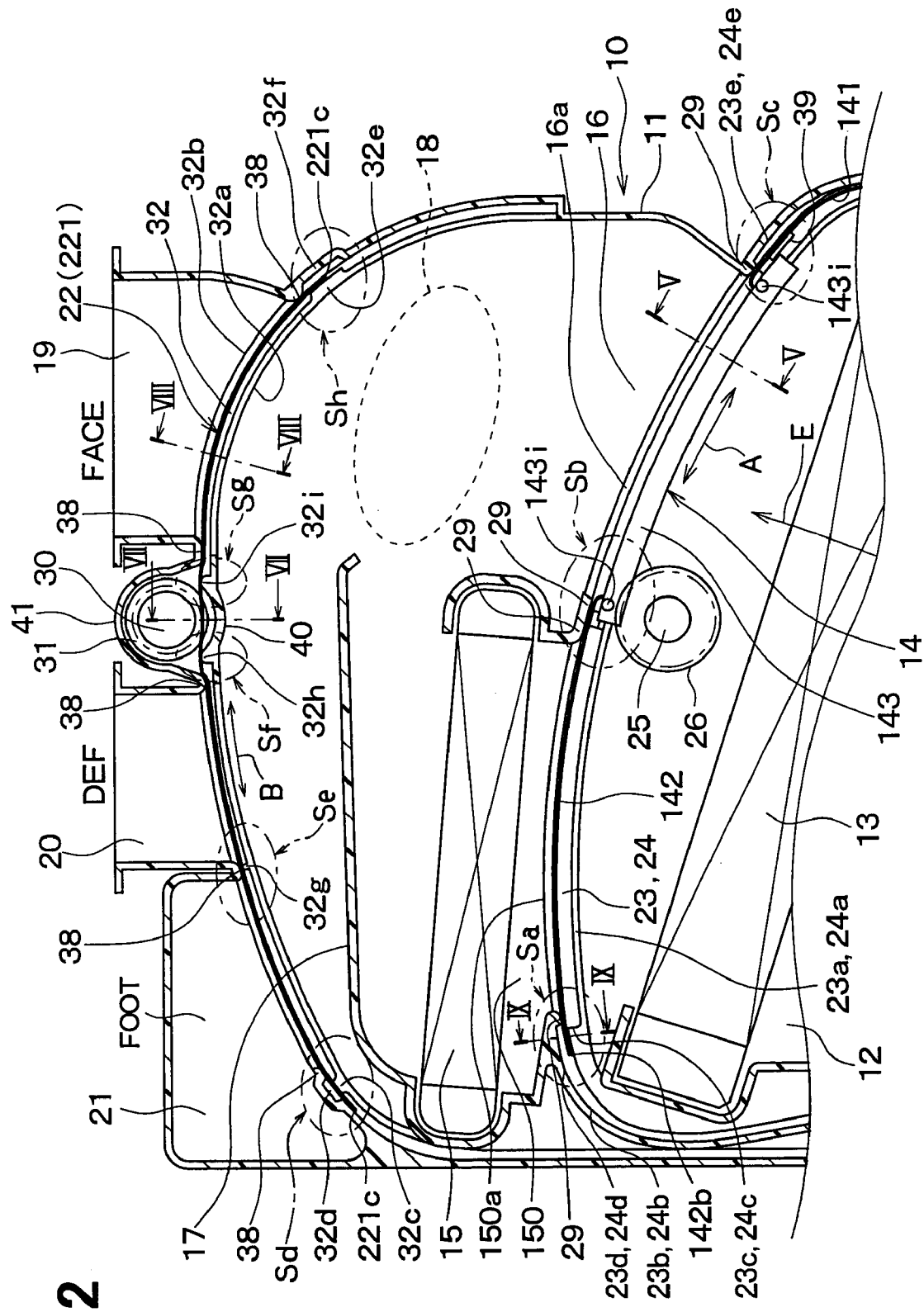
FIG. 2 is an enlarged view showing a main part of the air-conditioning unit shown in FIG. 1.

As shown in FIG. 1, the slide door 14 and the slide door 22 reciprocate along curved paths in the air-conditioning case 11. The doors 14, 22 include flexible film members (resin film members) 141, 142, 221 so as to be deformed along the curved paths. A resin material such as Polyethylene Terephthalate (PET), which is flexible and has a low frictional resistance, is suitably used as a specific material of the film members 141, 142, 221. The film members 141, 142, 221 are set to have a very small thickness in a range, for example, 100–250 $\mu$m. Therefore, each of the film members 141, 142, 221 is readily deformed along the curved shape of the reciprocation path, so that operational force for moving the slide doors 14, 22 is restricted from being greatly increased due to the bending of the film members 141, 142, 221. Furthermore, in this thickness range, a rigidity required for moving the slide doors 14, 22 is ensured.

Figure 3:
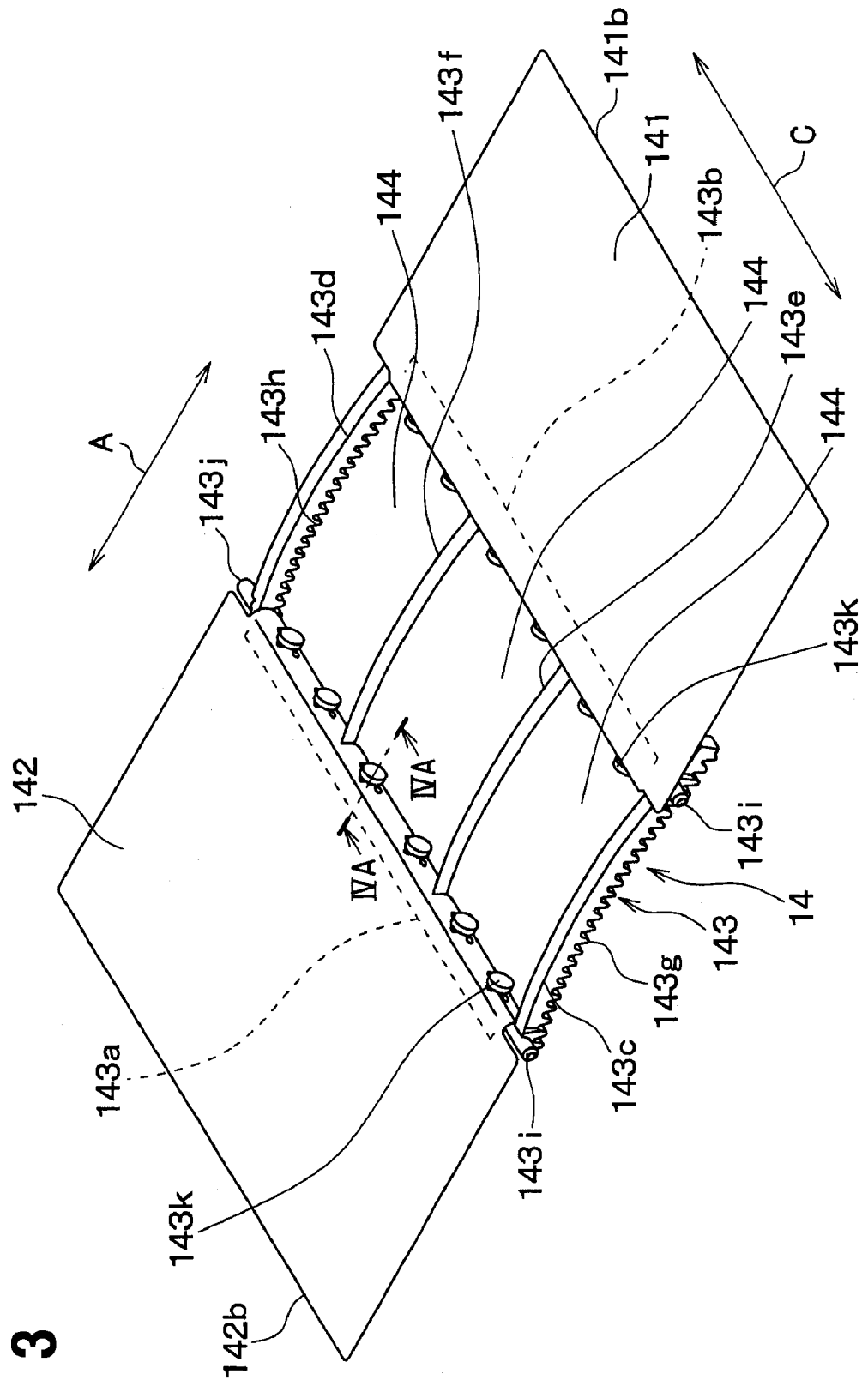
FIG. 3 is a perspective view showing an air mixing slide door used in the first embodiment.

Next, the slide door 14 will be specifically described. As shown in FIG. 3, the slide door 14 includes a support member 143 at a center area of the slide door 14 in the door moving direction A, and film members 141, 142 at two end sides of the support member 143 in the door moving direction A. The support member 143 has a frame shape, and air can pass through the support member 143. The film members 141, 142 do not have an opening. The support member 143 is a rigid body molded by resin such as polypropylene, and includes frame portions 143a–143d. The frame portions 143a, 143b extend in a door width direction C perpendicular to the door moving direction A, and the frame portions 143c, 143d extend in the door moving direction A. The frame portions 143a, 143b are connected to the frame portions 143c, 143d so that a substantially rectangular frame is formed.

Two reinforcing ribs 143e, 143f are disposed at intermediate positions between two frame portions 143a, 143b to extend in the door moving direction. The frame portions 143a–143d and the reinforcing ribs 143e, 143f are integrally molded by resin so that the support member 143 is curved in a circular arc shape along the door moving direction A. The frame portions 143a–143d define an opening 144 through which air passes, and the opening 144 is separated into three portion parts by the two reinforcing ribs 143e, 143f.

The support member 143 increases the rigidity of the film members 141, 142, and transmits operational force (driving force) to the film members 141, 142. In order to transmit the operational force to the film members 141, 142, gears (racks) 143g, 143h, extending in the door moving direction A, are integrally molded with lower surfaces of the frame portions 143c, 143d. The gears 143g, 143h are provided so as to extend in a circular arc shape along the circular arc shape of the frame portions 143c, 143d.

Each of the frame portions 143a, 143b, extending in the door width direction C, includes cylindrical guide pins 143i, 143j at its two ends in its longitudinal direction. The guide pins 143i, 143j protrude from the two ends of the support member 143 outside in the door width direction C, and are inserted into guide ditches 23, 24 of the air-conditioning case 11 to be slidable therein. The guide ditches 23, 24 will be described later in detail.

Figure 4A:
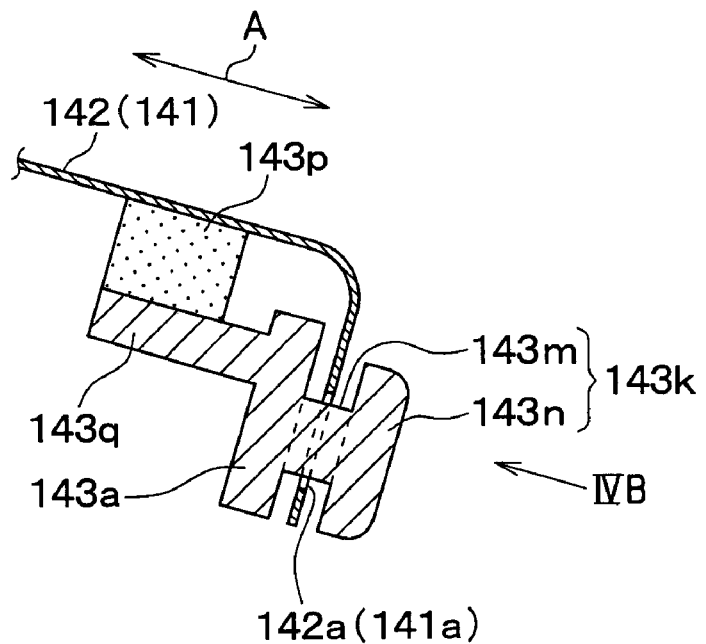
FIG. 4A is a cross-sectional view taken along line IVA—IVA in FIG. 3.

Further, each of the frame portions 143a, 143b includes plural (e.g. six in FIG. 3) attachment pins 143k at predetermined intervals in its longitudinal direction. The attachment pins 143k are integrated to the frame portions 143a, 143b at a side of the opening 144. As shown in FIG. 4A, the attachment pin 143k includes a cylindrical shaft portion 143m, and a head portion 143n enlarged in a mushroom shape at a top end of the shaft portion 143m. The shaft portion 143m and the head portion 143n are integrated to each other to form the attachment pin 143k.

Figure 4B:
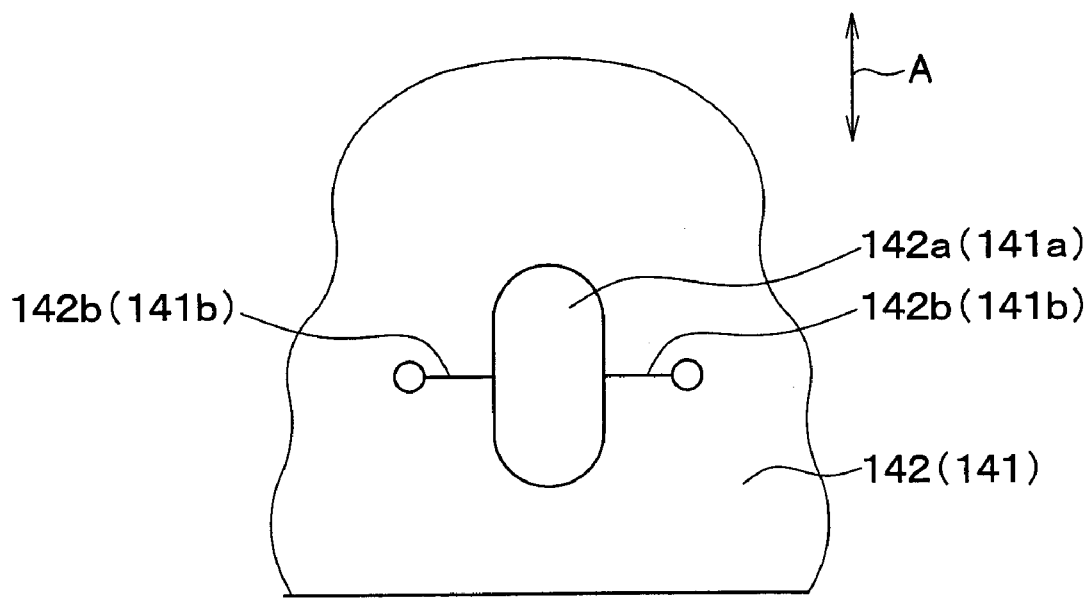
FIG. 4B is an enlarged side view when being viewed from the arrow IVB in FIG. 4A.

As shown in FIG. 4B, the film member 141 includes elliptical attachment holes 141a around its one end, and is bent to a lower side around its one end. Similarly, the film member 142 includes elliptical attachment holes 142a around its one end, and is bent to the lower side around its one end. A major axis direction of each of the attachment holes 141a, 142a is directed in the door moving direction A of the film members 141, 142. The film member 141 has slits 141b each extending from the attachment hole 141a to right and left sides in a minor axis direction of the attachment hole 141a. Similarly, the film member 142 has slits 142b each extending from the attachment hole 142a to right and left sides in a minor axis direction of the attachment hole 142.

A major dimension of each of the attachment holes 141a, 142a is set larger than a radial dimension of the head portion 143n of the attachment pin 143k. On the other hand, a minor axial dimension of each of the attachment holes 141a, 142a is set smaller than the radial dimension of the head portion 143n, and is set equal to or larger than a radial dimension of the shaft portion 143m of the attachment pin 143k. Therefore, when the attachment pin 143k is inserted into the attachment hole 141a, 142a, the head portion 143n of the attachment pin 143k can be inserted into the attachment hole 141a, 142a by expanding the slits 141b, 142b. After the head portion 143n passes through the attachment hole 141a, 142a, and the expanded slits 141b, 142b return to its original shape by restoring force of the film members 141, 142. Thus, the head portion 143n can be accurately attached into the attachment holes 141a, 142a, so that one end portion of each of the film members 141, 142 can be connected to the support member 143. The other end portion of each of the film members 141, 142 is a free end which is not supported by the support member 143.

As shown in FIG. 4A, the frame portion 143a extending in the door width direction C includes a support plate 143q to which an elastic member 143p is fixed by adhesive and the like. The support plate 143q is molded integrally with the frame portion 143a. The elastic member 143p presses one end side of the film member 141, 142 to a seal surface 29 of the air-conditioning case 11 by elastic force of itself (refer to FIGS. 1, 5), thereby improving a sealing performance of the film members 141, 142. Similarly, the frame portion 143b extending in the door width direction perpendicular to the door moving direction A also includes the support plate 143q to which the elastic member 143p is fixed by adhesive and the like.

Figure 5:
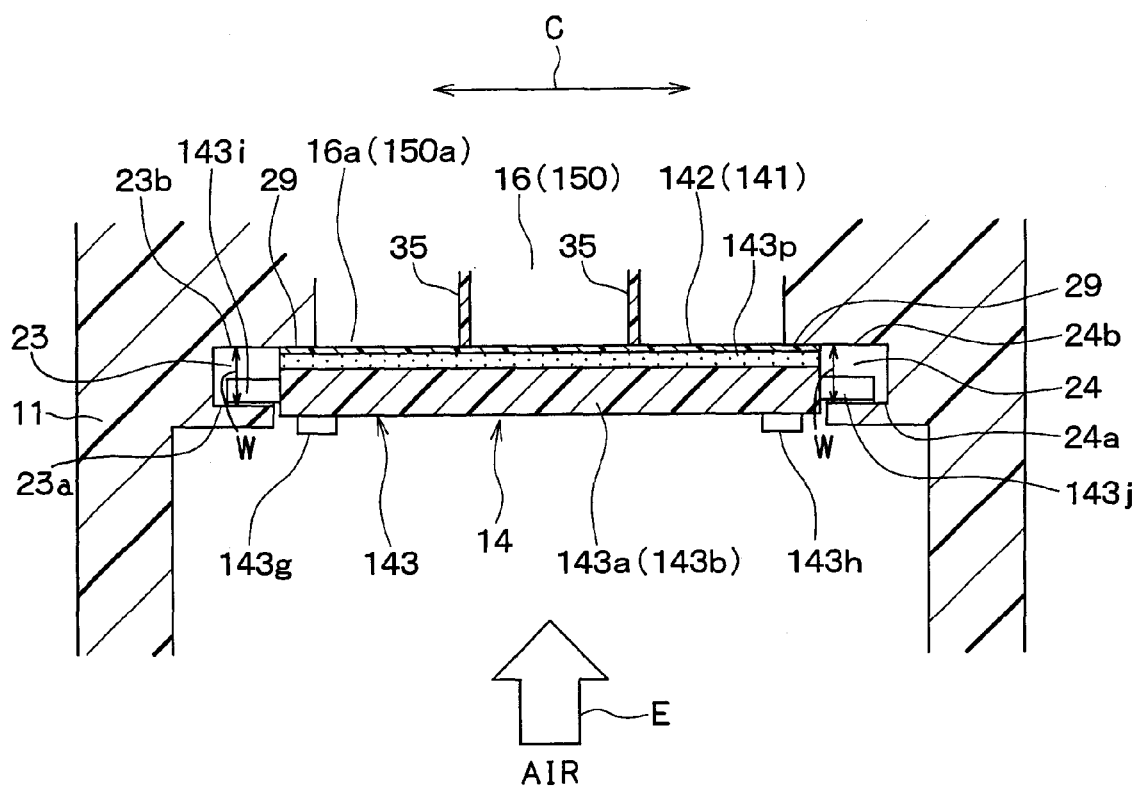
FIG. 5 is a cross-sectional view taken along line V—V in FIG. 1.

At a position of V—V line in FIG. 1, the film members 141, 142 and the guide pin 143i, 143j are not positioned, and only the support member 143 is positioned. Although FIG. 5 is a cross-sectional view taken along line V—V in FIG. 1, FIG. 5 shows a condition where the film members 141, 142 and the guide pin 143i, 143j are moved at the position of V—V line in FIG. 1. As shown in FIG. 5, the guide ditches 23, 24, extending in the door moving direction A, are provided at right and left sides of an inner wall surface of the air-conditioning case 11 lower than the cool air passage 16 and the warm air passage 150. The guide ditches 23, 24 are groove spaces provided between guide walls 23a, 24a and guide walls 23b, 24b, respectively. The guide walls 23a, 24a are positioned at an upstream side in an air flow direction, and the guide walls 23b, 24b are positioned at a downstream side in the air flow direction. The guide walls 23a, 24a, 23b, 24b can be formed integrally with the air-conditioning case 11 by resin molding. The guide ditches 23, 24 are provided along the entire reciprocation path of the slide door 14.

The slide door 14, including the film members 141, 142 and the support member 143, is guided by the guide ditches 23, 24 to be slidable in the guide ditches 23, 24. In FIG. 5, a ditch space width W between the guide walls 23a, 23b and a ditch space width W between the guide walls 24a, 24b are set larger than a radial dimension of the guide pins 143i, 143j in a moving area of the guide pins 143i, 143j, that is, in a sum opening area of both opening portions 16a, 150a of the cool air passage 16 and the warm air passage 150 in the door moving direction A shown in FIG. 1. Thus, the guide pins 143i, 143j are supported by the guide ditches 23, 24 to be slidable in the guide ditches 23, 24. On the other hand, in the guide ditches 23, 24, the guide pins 143i, 143j do not move in an area at a vehicle front side and vehicle rear side relative to the moving area of the guide pins 143i, 143j. Thus, in this area, only the two ends of the film members 141, 142 in the door width direction C are supported by the guide ditches 23, 24 to be slidable in the ditches 23, 24.

Accordingly, in the guide ditches 23, 24, the ditch space width W is not required to be larger than the radial dimension of the guide pins 143i, 143j in the area at the vehicle front and rear sides relative to the moving area of the guide pins 143i, 143j. In the guide ditches 23, 24, the ditch space width W in the moving area is set in a range between 3–6 mm for moving the guide pin 143i, 143j and for removing the molded resin from a die and the like. On the other hand, the ditch space width in the area at the vehicle front side and the area at the vehicle rear side from the moving area is set in a range between 1–3 mm for removing the molded resin from the die and the like.

As shown in FIG. 1, a door driving shaft 25 is disposed in the door width direction (vehicle right-left direction) C at a position directly below the slide door 14 in the air-conditioning case 11, at an intermediate position between the cool air passage 16 and the warm air passage 150 in the vehicle front-rear direction. Both ends of the door driving shaft 25 are rotatably supported by bearing holes (not shown) provided in a wall surface of the air-conditioning case 11. Circular driving gears (pinions) 26 are integrated to the door driving shaft 25 by resin molding, at positions corresponding to the gears 143g, 143h formed on the lower surfaces of the frame portions 143c, 143d. The circular driving gears 26 engage with the gears 143g, 143h. One end of the door driving shaft 25 protrudes outside the air-conditioning case 11, and is connected to an output shaft of a servomotor (not shown) forming a door driving device through a suitable connection mechanism. Therefore, a rotation of the servomotor is transmitted to the door driving shaft 25, and the rotation of the door driving shaft 25 is transformed to reciprocation movement of the slide door 14 by engagement between the circular driving gears 26 and the door gears 143g, 143h.

As shown in FIG. 5, in a state where the slide door 14 is attached to the air-conditioning case 11, the support member 143 is disposed at the upstream side of the film members 141, 142 in the air flow direction. Only one end of each of the film members 141, 142 in the door moving direction A is attached to the support member 143. Therefore, when the film members 141, 142 receive wind pressure in the air flow direction, the film members 141, 142 are pressed to the seal surface 29 of the air-conditioning case 11. The seal surface 29 is formed on peripheral wall portions defining the opening portions 16a, 150a of the cool air passage 16 and the warm air passage 150. The air-conditioning case 11 is provided with a grid 35 in the opening portions 16a, 150a, and the grid 35 restricts the film members 141, 142 from being bent due to the wind pressure.

Figure 6A:
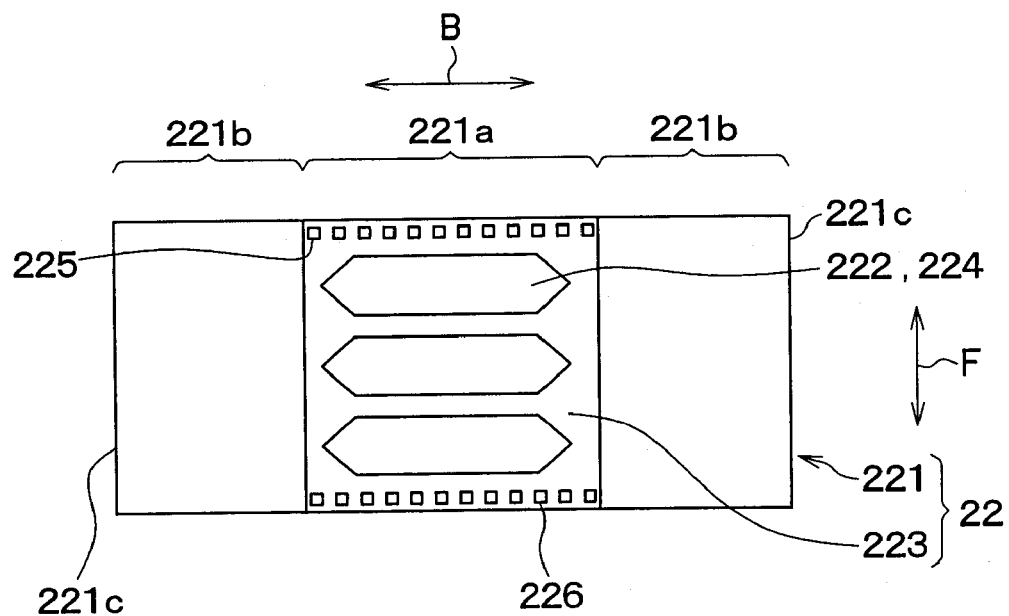
FIG. 6A is a front view showing an air-outlet mode slide door used in the first embodiment.

Next, the air-outlet mode slide door 22 will be described with reference to FIGS. 6A, 6B. The slide door 22 is formed simply by a film member, to be different from the air-mixing slide door 14 having the support member. The slide door 22 includes a film member 221 that moves in a door moving direction B. The film member 221 has plural openings 222 separated from each other, through which air flows, at its center in the door moving direction B. The film member 221 includes a film portion 221a having the openings 222, and film portions 221b without an air opening. The film portions 221b are disposed at both sides of the film portion 221a in the door moving direction B. A reinforcing film 223, for increasing rigidity of the film portion 221a, is attached to the film member 221. Because the reinforcing film 223 has openings 224 whose shape is identical to the openings 222 in the film portion 221a, air passes through the openings 222, 224 without a restriction due to the attachment of the reinforcing film 223.

A material, thickness and the like of the film member 221 can be made identical to those of the film members 141, 142 of the slide door 14. Thickness (e.g., 0.2–1 mm) of the reinforcing film 223 is set larger than the thickness (e.g., 100–250 μm) of the film member 221, thereby increasing the rigidity of the film portion 221a as compared with the rigidity of the film portion 221b. A specific material of therein forcing film 223 is selected in consideration of its mechanical strength and its adhesiveness with the film member 221. Resin such as polybutylene terephthalate (PBT) and polypropylene is suitably used for forming the reinforcing film 223. Instead of attachment of the reinforcing film 223 to the film member 221, a portion corresponding to the reinforcing film 223 may be integrated to the film member 221 by resin molding.

The film portion 221a and the reinforcing film 223 have gear-engagement openings 225, 226 at end portions in a door width direction F. Further, a door driving shaft 30 is disposed above the slide door 22 in the door width direction F that is perpendicular to the door moving direction B, between the face port 19 and the defroster port 20 provided in an upper portion of the air-conditioning case 11.

Figure 7:
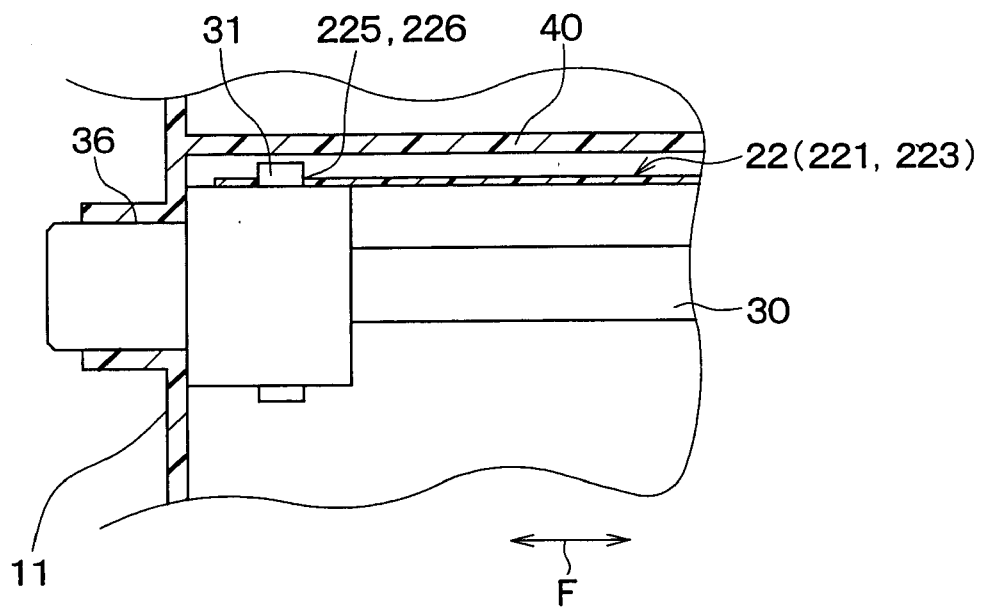
FIG. 7 is a cross-sectional view taken along line VII—VII in FIG. 1.

As shown in FIG. 7, two ends of the door driving shaft 30 are rotatably supported by bearing openings 36 provided in the wall surface of the air-conditioning case 11. The door driving shaft 30 includes driving gears 31 at positions corresponding to the gear-engagement openings 225, 226. The driving gears 31 are integrated with the door driving shaft 30 by resin molding. The driving gears 31 include plural teeth engaging with the gear-engagement openings 225, 226.

One end of the door driving shaft 30 protrudes outside the air-conditioning case 11, and is connected to an output shaft of a servomotor (not shown) forming a door driving device through a suitable connection mechanism. Therefore, a rotation of the servomotor is transmitted to the door driving shaft 30, and the rotation of the door driving shaft 30 is transformed to reciprocation movement of the slide door 22 by the engagement between the driving gears 31 and the gear-engagement openings 225, 226.

Figure 8:
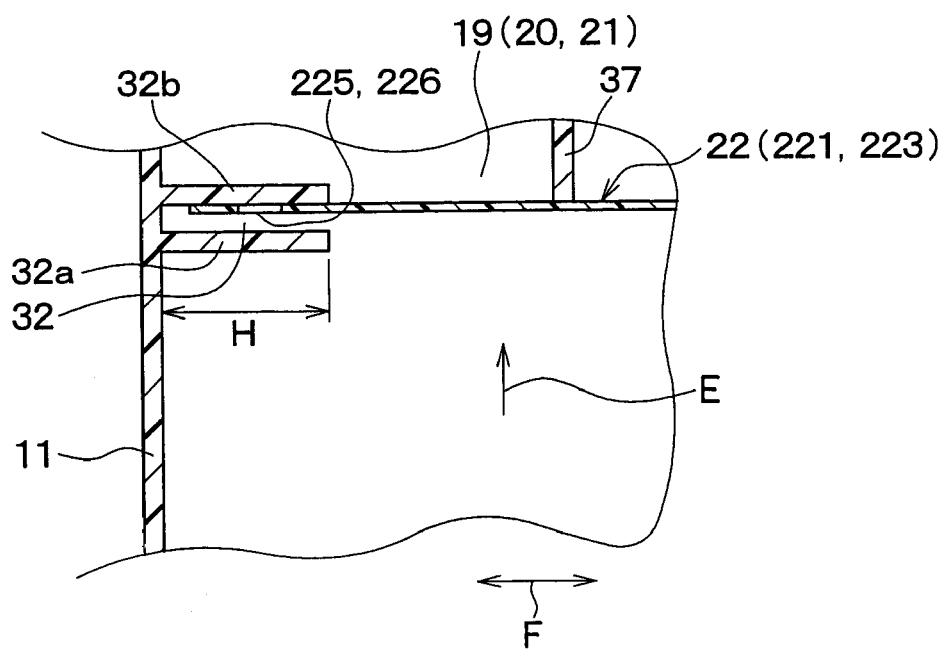
FIG. 8 is a cross-sectional view taken along line VIII—VIII in FIG. 1.

Guide ditches 32 (guide groove) similar to the guide ditches 23, 24 are provided on the inner wall surface of the air-conditioning case 11, so that the film members 221, 223 reciprocates along a curved path in the air-conditioning case 11. Right and left ends of the film members 221, 223 in the door width direction F are inserted into the guide ditches 32, and are guided along the guide ditches 32, as shown in FIG. 8. In FIG. 8, only the guide ditch 32 at one side in the door width direction F is shown. A grid 37 is provided to restrict the film members 221, 223 from being bent due to the wind pressure, similarly to the grid 35. The ditch width of the guide ditches 32 in the air flow direction E is set in a range of 1–3 mm for removing the molded resin of the air-conditioning case 11 from a die, in the resin molding.

The guide ditch 32 is a groove provided between a guide wall 32a and a guide wall 32b at a downstream side of the guide wall 32a in the air flow direction. The guide walls 32a, 32b can be formed integrally with the air-conditioning case 11 by the resin molding. As shown in FIG. 8, the guide walls 32a, 32b are located in the air conditioning case 11 around the air ports 19, 20, 21. Therefore, the guide walls 32a, 32b protrude from the inner wall surface of the air-conditioning case 11 by a minimum necessary height H (e.g., 10 mm). Therefore, it can restrict air flow resistance from being increased due to the guide walls 32a, 32b. The guide ditches 32 are provided along the entire reciprocation path of the slide door 22 (film member 221). However, at a position where the driving gears 31 are disposed, the space of the guide ditches 32 is enlarged so that the driving gears 31 can be rotatable.

Figure 6B:
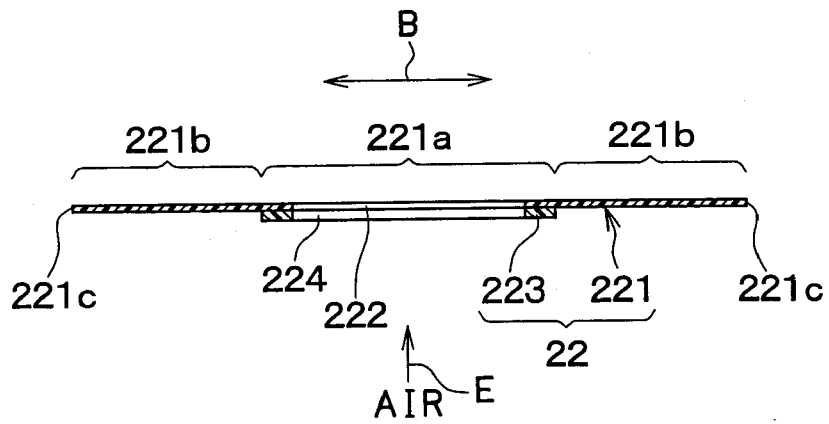
FIG. 6B is a cross-sectional view showing the air-outlet mode slide door.

In a state where the mode switching door is attached into the air-conditioning case 11 as shown in FIG. 1, the reinforcing film 223 is positioned at the upstream side of the film member 221 in the air flow direction as shown in FIG. 6B. As shown in FIG. 8, peripheral portions of the gear-engagement openings 225, 226 of the film members 221, 223 are placed in the ditch spaces of the guide ditches 32, and tightly contact the surfaces of the guide walls 32b positioned at the downstream air side of the film members 221, 223. Therefore, air does not leak from the gear-engagement openings 225, 226.

In the first embodiment, as shown in FIGS. 1, 5, the air-mixing slide door 14 is set so that the film members 141, 142 is positioned proximate to the seal surface 29 formed on the peripheral portions of the opening portions 16a, 150a of the air-conditioning case 11. Similarly, the shape of the air-outlet mode slide door 22 is set so that the film member 221 is positioned proximate to the seal surface 38 formed on the peripheral portions of the air outlet ports 19–21 of the air-conditioning case 11.

Next, the shapes of the guide ditches 23, 24, 32, for pushing the film members 141, 142, 221 to the seal surfaces 29, 38, will be specifically described. In FIGS. 1 and 2, seal portions Sa, Sb, Sc are provided on the peripheral portions of the opening portions 16a, 150a, in the door width direction C perpendicular to the door moving direction A. Further, seal portions Sd–Sh are provided on the peripheral portions of the air outlet ports 19–21, in the door width direction F perpendicular to the door moving direction B. The seal portions Sa, Sd, Sh are formed so that the guide ditches 23, 24, 32 are offset from the seal surfaces 29, 38 to the downstream air side by a predetermined dimension (e.g., 1–10 mm) at outside positions in the door moving directions A, B.

Specifically, as shown in FIGS. 1, 2, 5 and 9, the seal portion Sa at the vehicle front side of the opening portion 150a, protrusions 23c, 24c are formed on the guide walls 23a, 24a at the upstream air side of the guide wall 23a, 24a to protrude from the guide wall 23a, 24a to the inside of the guide ditches 23, 24. On the guide walls 23b, 24b at the downstream air side of the guide ditches 23, 24, recess portions 23d, 24d are provided to be recessed to the downstream air side along the shape of the protrusions 23c, 24c. Thus, the offset portion offset to the downstream air side is provided on the guide ditches 23, 24. The IX—IX cross-section is positioned outside the air passage area in FIG. 1. The guide walls 23b, 24b are formed along an entire width of the air-conditioning case 11, and the seal surface 29 is also formed along the entire width of the air-conditioning case 11. On the other hand, the guide walls 23a, 24a (protrusions 23c, 24c) are formed to have a predetermined height H (e.g., approximate 10 mm). The predetermined height H is restricted to be small as possible, so that the air conditioning case 11 is readily molded.

In the seal portion Sd at the vehicle front side of the foot port 21, a protrusion 32c is formed on the guide wall 32a at the downstream air side to protrude to the downstream air side in the guide ditch 32 (i.e., inside of the guide ditch 32), similarly to the seal portion Sa. Further, on the guide wall 32b at the downstream air side, a recess portion 32d is provided to be recessed to the downstream air side along the shape of the protrusion 32c. Thus, an offset portion offset to the downstream air side is provided in the guide ditch 32 by the combination between the protrusion 32c of the guide wall 32a at the upstream air side and the recess portion 32d of the guide wall 32b at the downstream air side. Similarly, in the seal portion Sd at the vehicle front side of the foot port 21, an offset portion offset to the downstream air side is provided in the guide ditch 32 by the combination between a protrusion 32e of the guide wall 32a at the upstream air side and a recess portion 32f of the guide wall 32b at the downstream side. Here, a protrusion height of the protrusions 32c, 32e can be equal to the height H shown in FIG. 8. On the other hand, because the recess portions 32d, 32f are located outside the air passage area, the recess portions 32d, 32f can be provided along the entire width of the air-conditioning case 11.

The seal portion Sb is located at an intermediate position between the warm air passage 150 and the cool air passage 16 in the vehicle front-rear direction. Therefore, the guide pins 143i, 143j of the support member 143 penetrate through the guide ditches 23, 24 around the seal portion Sb. Accordingly, a rib portion and the like, for reducing the width dimension of the guide ditches 23, 24, is not provided in the ditches 23, 24 around the seal portion Sb so that the guide pins 143i, 143j can pass smoothly therein. Accordingly, in the seal portion Sb, the film members 141, 142 press-contact the seal surface 29 by wind pressure and elastic pressing force of the elastic member 143p, thereby improving sealing function.

Figure 10:
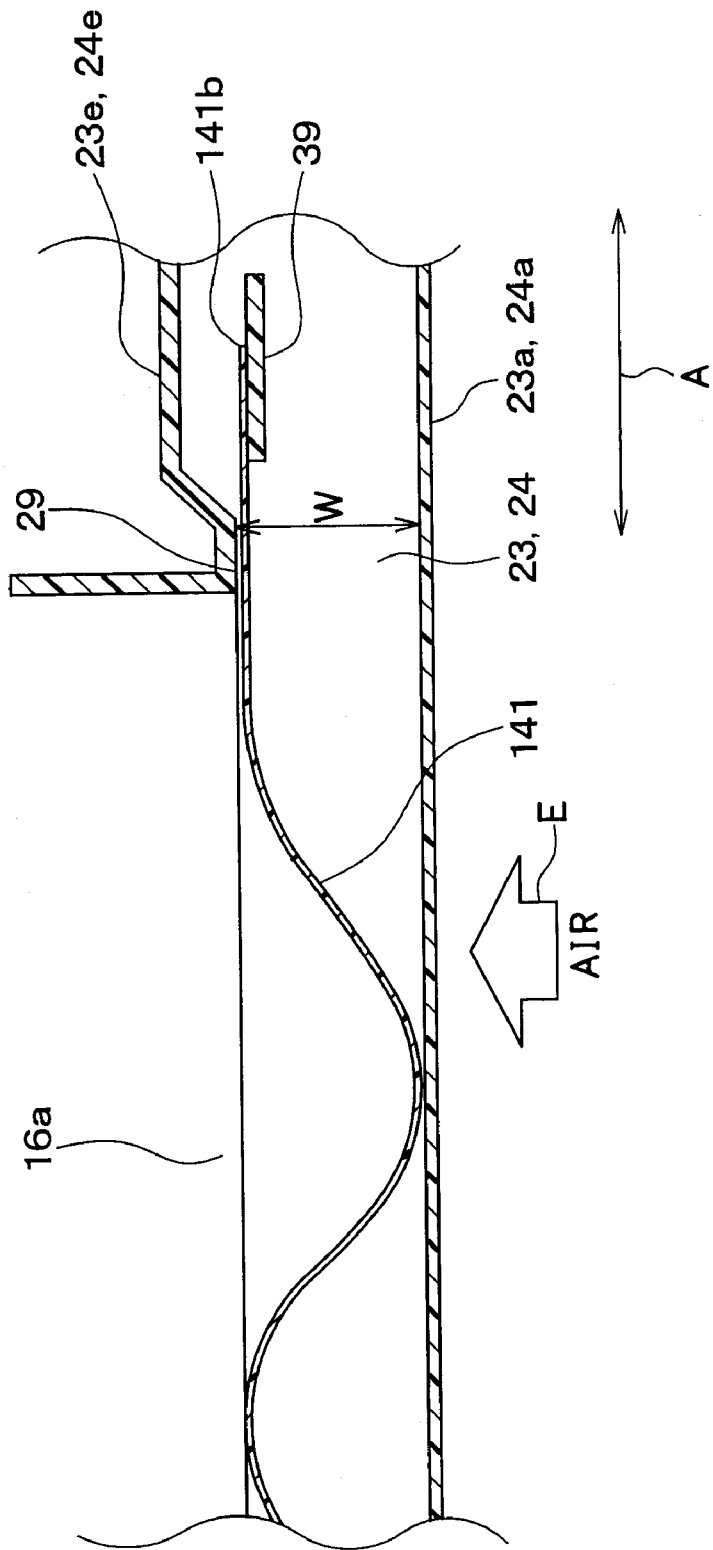
FIG. 10 is an enlarged sectional view showing a seal portion Sc in FIG. 1.

In the seal portion Sc at the vehicle rear side of the opening portion 16a, a lift rib 39 (pushing member) is provided in the guide ditches 23, 24. As shown in FIG. 10, the lift rib 39 is disposed near the seal surface 29 of the opening 16a on the vehicle rear side, at a position offset from the seal surface 29 to the outside (vehicle rear side) of the opening portion 16a by a predetermined dimension. Specifically, the lift rib 39 is disposed at a position offset from the guide walls 23a, 24a to the downstream air side. A portion, facing the lift rib 39, of the guide walls 23b, 24b has recess portions 23e, 24e that are recessed to the downstream air side relative to the seal surface 29 on the peripheral portion of the opening portion 16a.

The film member 141 is always inserted between the seal surface 29 and the lift rib 39, while passing therebetween. A clearance between the seal surface 29 and the lift rib 39 is very small, and is slightly larger than the thickness of the film member 141. That is, the lift rib 39 pushes the film member 14 to the seal surface 29 in the direction perpendicular to the door moving direction A, so that a clearance between the film member 14 and the seal surface 29 in the door width direction is made smaller than the other peripheral portions of the opening portion 16a. Thus, the surface of the film member 141 can accurately contact the seal surface 29. Generally, a dimension of the lift rib 39 in the door moving direction A is set in a range between 1–10 mm. The lift rib 39 can be also integrated to the air-conditioning case 11 by the resin molding. In consideration of moldability of the air-conditioning case 11, the lift rib 39 is formed so as to protrude from the inner wall surface of the air-conditioning case 11 at a predetermined height (e.g., approximate 10 mm), similarly to the guide walls 23a, 24a.

In the seal portion Se between the foot port 21 and the defroster port 20, the width dimension of the guide ditch 32 is made much smaller than that in the other portions. Therefore, a protrusion 32g, protruding toward the seal surface 38 on the peripheral portion of the air outlet ports 20, 21, is integrated to the guide wall 32a by the resin molding. When the protrusion 32g is formed integrally with the air conditioning case 11 together with the guide wall 32a, a clearance between the seal surface 38 and the protrusion 32g (width dimension of the reduced ditch portion in the guide ditch 32) is set in a range of 1–2 mm, from the moldability constraints. If the protrusion 32g or the guide wall 32a including the protrusion 32g is molded separately from the air-conditioning case 11, the width dimension of the reduced ditch portion can be further reduced (e.g., approximate 0.5 mm).

The seal portion Sf is located at the vehicle rear side of the defroster port 20, and the seal portion Sg is located at the vehicle front side of the face port 19. The seal portions Sf, Sg are formed so that the film member 221 can be more surely pressed to the seal surface 38 on the peripheral portions of the air outlet ports 19, 20. Therefore, protrusions 32h, 32i, protruding to the downstream air side, are formed integrally with the guide wall 32a at the upstream air side. Protrusion heights of the protrusions 32h, 32i are set so that top ends of the protrusions 32h, 32i protrude to the downstream air side relative to the seal surface 38. Because the seal portions Sf, Sg are located adjacent to the door driving shaft 30, the guide wall 32a below the door driving shaft 30 is provided with a lower-side semi-cylindrical cover 40 for covering a lower side of the door driving shaft 30. The guide wall 32b above the door driving shaft 30 is provided with an upper-side semi-cylindrical cover 41 for covering an upper side of the door driving shaft 30.

The upper side cover 41 curves to the upper side (downstream air side) of the door driving shaft 30 in an approximate semi-cylindrical shape. Therefore, even if the top ends of the protrusions 32h, 32i protrude to the downstream air side from the seal surface 38, a passing path of the film member 221 can be sufficiently provided at the upper side (downstream air side) of the protrusions 32h, 32i. Since the upper and lower side covers 40, 41 are formed along the entire width of the air-conditioning case 11, the protrusions 32h, 32i are also formed along the entire width thereof. Further, in the seal portions Sa–Sh, the protrusions 23c, 24c, 32c, 32g are formed on the guide walls 23a, 24a, 32a in the same range as the height H of the guide walls 23a, 24a, 32a in the door width directions C, F.

Next, operation of the vehicle air conditioner according to the first embodiment will be described. The slide door 14 reciprocates in the door moving direction A (vehicle front-rear direction), so that a communication area between the opening portion 144 of the support member 143 of the slide door 14 and the opening portions 150a, 16a of the warm air passage 150 and the cool air passage 16 is adjusted. Therefore, cool air from the cool air passage 16 and warm air from the heater core 15 are mixed with each other at a predetermined air-amount ratio, thereby obtaining conditioned air having a desired air temperature. FIG. 1 shows a maximum cooling state where the slide door 14 moves to the most rear side of the vehicle. In the maximum cooling state, the opening portion 16a of the cool air passage 16 is entirely opened by the opening portion 144 of the support member 143 of the slide door 14. On the other hand, the opening portion 150a of the warm air passage 150 is entirely closed by the film member 142 connected to the support member 143 at the vehicle front side.

When the slide door 14 moves to the most front side of the vehicle, the maximum heating state is set. In the maximum heating state, the opening portion of the warm air passage 150 is entirely opened by the opening portion 144 of the support member 143. At this time, the opening portion 16a of the cool air passage 16 is entirely closed by the film member 141 connected to the support member 143 at the vehicle rear side.

On the other hand, the film member 221 of the slide door 22 reciprocates in the door moving direction B (vehicle front-rear direction), so that the face port 19, the defroster port 20 and the foot port 21 are selectively opened and closed. Thus, any one of the air outlet modes such as a face mode, a bi-level mode, a foot mode, a foot-defroster mode and a defroster mode can be switched.

Next, advantages according to the first embodiment will be described. In the first embodiment, sealing performance can be effectively improved even when a bending habit causes in the film members 141, 142 of the slide door 14 and in the film member 221 of the slide door 22. In the seal portions Sa, Sc–Sh, shape changing portions (pushing member) are provided in the guide ditches 23, 24, 32. The film members 141, 142, 221 are enforced by the shape changing portions to be approached to the seal surfaces 29, 38 in the direction perpendicular to the door moving direction, on the peripheral portions of the opening portions 150a, 16a, 19–21. Therefore, even if the bending habit is generated at the free ends 141b, 142b, 221c of the film members 141, 142, 221, the film members 141, 142, 221 can be pushed to be approached to the seal surfaces 29, 38 by the shape changing portions in the guide ditches 23, 24, 32.

Especially, the shape changing portions in the guide ditches 23, 24, 32 are provided in correspondence with the seal surfaces 29, 38 in the door width directions C, F perpendicular to the door moving direction, the film members 141, 142, 221 can be approached to the seal surfaces 29, 38 in the door width directions C, F. Therefore, even if the wind pressure to the film members 141, 142, 221 is small, the film members 141, 142, 221 can be accurately pressed to the seal surfaces 29, 38 in the door width directions C, F. Accordingly, a clearance between the film member 141, 142, 221 and the seal surfaces 29, 38 in the door width direction C, F can be made generally smaller than a clearance between the film member 141, 142, 221 and the other seal surface in the door moving direction. If a clearance is formed on the seal surfaces 29, 38 in the door width directions C, F due to the bending habit of the film members 141, 142, 221, a large clearance area is formed, and a large amount of air leaks. However, in the first embodiment, the clearance due to the bending habit of the film members 141, 142, 221 can be prevented on the seal surfaces 29, 38 in the door width directions C, F, thereby effectively preventing the air leakage. For example, the shape changing portion is the protrusions 23c, 24c, 32c, 32g, 32h, 32i, 32e (i.e., pushing members).

The shape changing portions are provided only around the seal surfaces 29, 38 in the door width directions C, F. Therefore, in the first embodiment, the molding die of the air-conditioning case 11 can be more readily formed, as compared with the molding die of an air-conditioning case having the guide ditches 23, 24, 32 with a small width dimension along the entire length in the door moving directions A, B. Thus, the air-conditioning case 11 can be readily molded from the molding dice with a simple structure, while sealing performance can be effectively ensured.

In the seal portion Se, the reduced width portion is provided by the protrusion 32g in the guide ditch 32. Because the protrusion 32g is formed in a small area of 1–5 mm in the door moving direction B, the reduced width portion due to the protrusion 32g can be formed by an integral resin-molding in the guide ditch 32.

In the seal portions Sa, Sc, Sd, Sf–Sh, the width dimensions of the shape changing portions in the guide ditches 23, 24, 32 is made larger than that of the reduced width portion in the guide ditch 32 in the seal portion Se. Therefore, the shape changing portion can be readily formed by the molding dice used for the integral resin molding of the air-conditioning case 11. In the seal portion Sa, the protrusions 23c, 24c on the guide walls 23a, 24a can be used as a stopper for determining a stop position of the guide pins 143i, 143j, that is, a stop position of the slide door 14. Similarly, the lift rib 39 can be also used as a stopper in the seal portion Sc.

In the seal portions Sf, Sg, the film member 221 can be pressed by the protrusions 32h, 32i directly to the seal surface 38 on the peripheral portions of the air outlet ports 19, 20, thereby further improving the sealing performance. Top ends of the protrusions 32h, 32i are positioned in a space, for containing the door driving shaft 30, formed by the upper side cover 41. Therefore, the movement of the film member 221 is not affected by the door driving shaft 30. When the film member 221 is excessively pressed by the protrusions 32h, 32i, operation force of the slide door 22 is increased. Therefore, preferably, the film member 221 should be pressed by a minimum force required for ensuring the sealing performance.

Next, a comparison example will be now described with reference to FIG. 11. In this comparison example shown in FIG. 11, the recess portions 23e, 24e and the lift rib 39 shown in FIG. 10 are eliminated from the air passage opening/closing device according to the first embodiment. Here, the guide ditches 23, 24 have a bending shape including various radius of curvature, and the film member 141 sometimes stays in the guide ditch 23, 24 at a bending portion having a small radius of curvature for a long time. In this case, the film member 141 is bent along the shape of the bend portion having the small radius of curvature. When the film member 141 stays at plural positions of the guide ditches 23, 24, the film member 141 is bent with the bending habit at plural positions.

When a portion of the film member 141, which is bent with the bending habit at a small radius of curvature, moves to a portion having a large radius of curvature in the guide ditches 23, 24, the film member 141 is not fitted with the guide ditches 23, 24 in the radius of curvature. Therefore, as shown in FIG. 11, top portions α of the bending of the film member 141 contact the guide walls 23b, 24b, and bottom portions β of the bending of the film member 141 contact the guide walls 23a, 24a. Accordingly, the film member 141 is separated from the guide walls 23a, 24a, 23b, 24b at an intermediate portion between the top portion α and the bottom portion β of the film member 141. In this condition, when the opening portion 16a of the air passage 16 is closed, clearances Cx, Cy are formed between the film member 141 and the seal surface 29 on the peripheral portion of the opening portion 16a, so that air leakage is caused.

Here, air leakage from the clearances Cx, Cy will be now described in detail. Generally, the opening portion 16a has a rectangular shape. The clearance Cy is in the door moving direction A, and is provided partially at an end of the opening portion 16a in the door moving direction A. Therefore, an opening area due to the clearance Cy is small, and an air leakage amount from the clearance Cy is small. Therefore, the clearance Cy can be neglected in actual use. On the other hand, the clearance Cx is in a direction perpendicular to the door moving direction A, and is formed along the entire length of the end of the opening portion 16a in the direction perpendicular to the door moving direction A. Therefore, the opening area due to the clearance Cx is large, and an air leakage amount from the clearance Cx is much larger than that from the clearance Cy, so that the clearance Cx is important in actual use. In the first embodiment, as described above, by providing the shape changing portions (e.g., protrusions), the clearance Cx caused in the comparison example can be prevented, and the film member 141 can press-contact the seal surface 29.

(Second Embodiment)

Figure 12:
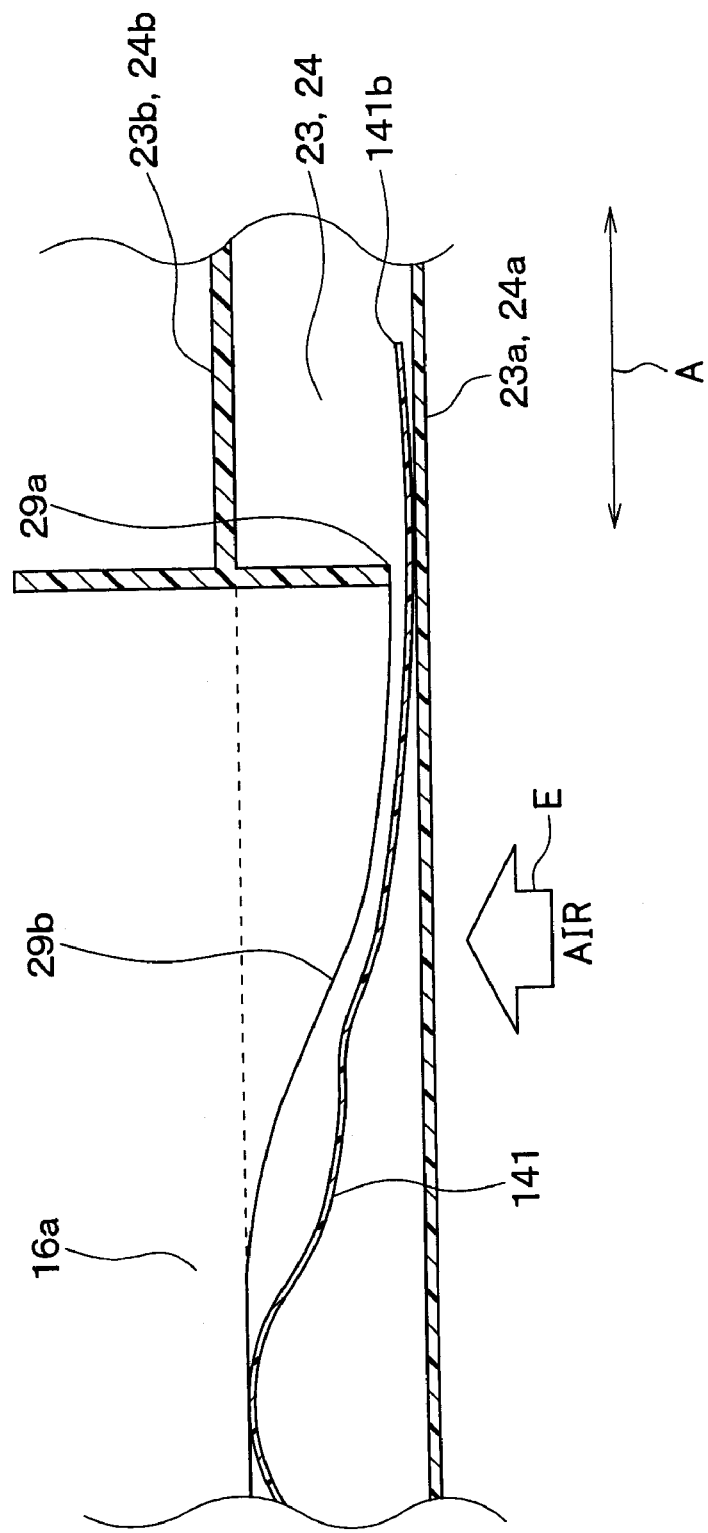
FIG. 12 is an enlarged cross-sectional view showing a main part of an air-conditioning unit according to a second preferred embodiment of the present invention.

In the above-described first embodiment, the shape changing portions are provided in the guide ditches 23, 24 and 32, so that the film members 141, 142, 221 are made to be proximate to the seal surfaces 29, 38 of the peripheral portions of the opening portions 150a, 16a, 19–21. However, in the second embodiment, the seal surfaces of the peripheral portions of the opening portions 150a, 16a, 19–21 are approached to the film members with the bending habit. As shown in FIG. 12, a protrusion plate 29a is formed to protrude to the upstream air side from an end surface of the opening portion 16a in the door width direction perpendicular to the door moving direction A. A protrusion plate 29b is formed to protrude to the upstream air side from an end surface of the opening portion 16a and to extend in the door moving direction A.

Among the protrusion plates 29a, 29b, the protrusion plate 29a protrudes in maximum to the upstream air side. A protrusion dimension to the upstream air side of the protrusion plate 29b is reduced toward the inside of the opening portion 16a in the door moving direction A. A protrusion top surface of the protrusion plate 29a is used as a seal surface in the door width direction C perpendicular to the door moving direction A, and a protrusion top surface of the protrusion plate 29b is used as a seal surface in the door moving direction A. The protrusion top surface of the protrusion plate 29a is approached to the guide walls 23a, 24a. Therefore, even if the bending habit is generated in the film member 141, the film member 141 is enforced to be approached to the seal surface on the top surface of the protrusion plate 29a, thereby accurately preventing air from leaking from the seal surface of the opening portion 16a in the door width direction.

The protrusion dimension of the protrusion plate 29b extending in the door moving direction A is large only around the protrusion plate 29a, and is made small at the other part (inside of the opening portion 16a). Therefore, in the second embodiment, a small clearance is formed in a narrow area between the guide walls 23a, 24a and the protrusion plate 29b, so that molding dice for forming the air-conditioning case 11 can be relatively readily formed. Similarly, the second embodiment can be applied to the opening portions 150a, 19–21, without being limited to the opening portion 16a.

(Third Embodiment)

As described above, the top ends of the film members 141, 142, 221 of the slide doors 14, 22 are the free ends 141b, 142b, 221c which are unbound to driving mechanisms. Therefore, the film members 141, 142, 221 are moved by rotation (pushing force and drawing force) of the driving shafts 25, 30. When the film members 141, 142, 221 are moved by pushing force of the driving shafts 25, 30, the free ends 141b, 142b, 221c of the film members 141, 142, 221 are caught by wall surfaces of the guide ditches 23, 24, 32 of the air conditioning case 11. Therefore, abnormal sound noises are generated, and door driving force is increased.

Figure 13:
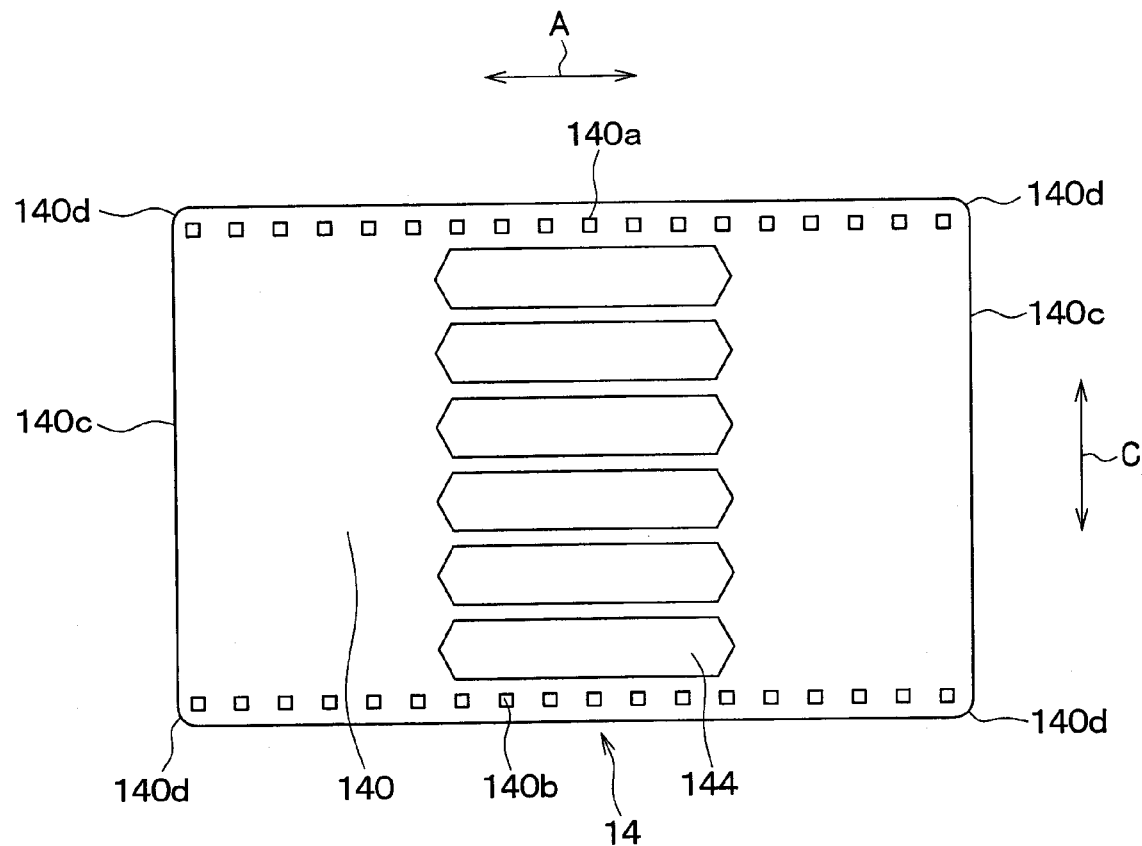
FIG. 13 is a front view showing a part of an air-mixing slide door of an air-conditioning unit according to a third preferred embodiment of the present invention.

An object of the third embodiment is to solve the above problem. FIG. 13 shows an air mixing slide door 14 of the third embodiment. As shown in FIG. 13, in the third embodiment, the slide door 14 is constructed of only a film member 140 similarly to the air-outlet mode slide door 22 of the first embodiment. The film member 140 corresponds to the film members 141, 142 shown in FIG. 3 of the first embodiment, and plural opening portions 144 provided in the film member 140 corresponds to the opening portion 144 shown in FIG. 3. Rigidity of peripheral portions of the opening portions 144 in the film member 140 is increased by a reinforcement member similar to the reinforcing film 223 shown in FIG. 6.

The film member 140 is provided with gear-engagement openings 140a, 140b corresponding to the gear-engagement openings 225, 226 shown in FIG. 6 around their two end areas in a door width direction C. The driving gears 26 are engaged with the gear-engagement openings 140a, 140b, so that the film member 140 reciprocates in the door moving direction A.

A plane shape (development shape) of the film member 140 is a rectangular as shown in FIG. 13, and has free ends 140c including four circular arc portions 140d each having a radius of curvature in a range of 1–4 mm. When the slide door 14 is constructed of only the film member 140, the width dimension of the guide ditches 23, 24 is set in a range of 1–3 mm. The guide ditches 23, 24 define a door moving path having a bending shape including various radius of curvature along the shape of the air-conditioning case 11. Accordingly, when the film member 140 is moved by the pushing force of the driving shaft 25, the free end 140c of the film member 140 moves while being pressed to the wall surfaces of the guide ditches 23, 24. Especially, when wind pressure is applied to the film member 140, the free end 140c is deformed to a complicated shape in the three dimensions, and corners of the free end 140c are readily caught by the wall surfaces of the guide ditches 23, 24.

Figure 14:
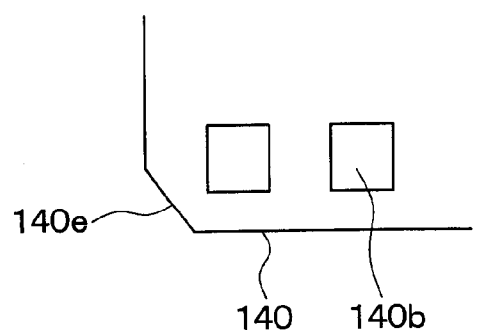
FIG. 14 is an enlarged view showing a corner of a film member of an air-mixing slide door according to a modification of the third embodiment.

However, in the third embodiment, the corner of the free end 140c does not have a sharpened right-angular shape, but has a smoothly curved shape to form the circular arc portion 140d. Therefore, the corners of the free end 140c can be prevented from being caught by the wall surfaces of the guide ditches 23, 24, chattering can be prevented from being caused when the film member 140 is moved by the pushing force of the driving shaft 25. Thus, it can prevent abnormal sound noises due to chattering, and increase of door driving force. Here, as shown in FIG. 14, chamfer portions 140e can be provided in place of the circular arc portions 14d. In this case, the effect similar to the circular arc portions 140d can be obtained.

Figure 15:
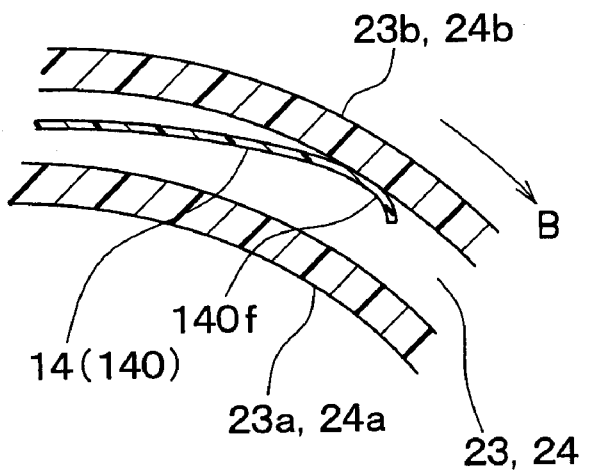
FIG. 15 is a cross-sectional view showing a main part of an air-mixing slide door according to another modification of the third embodiment.

As shown in FIG. 15, a circular-arc bending portion 140f can be provided in the free end 140c along its entire length in the door width direction. When the film member 140 is pushed along the guide ditch 23, 24 by pushing force of the driving shaft 25, a bending direction of the path of the guide ditch 23, 24 and a bending direction of the circular-arc bending portion 140f are made to correspond to each other in a moving direction of the film member 140. Accordingly, when the film member 140 is pushed along the guide ditch 23, 24 by the pushing force of the driving shaft 25, the circular-arc bending portion 140f of the free end 140c smoothly contacts the guide wall 23b, 24b, thereby further preventing the noise while the film member 140 is moved by the pushing force of the driving shaft 25.

Figure 16:
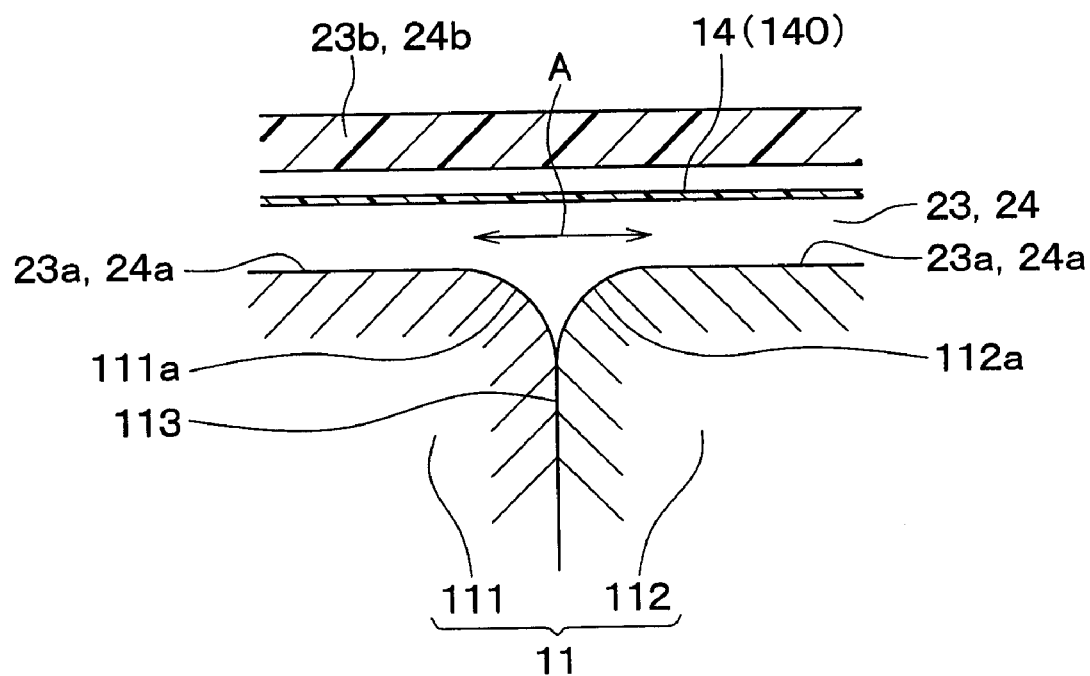
FIG. 16 is a cross-sectional view showing a main part of an air-conditioning unit according to another modification of the third embodiment.

FIG. 16 shows a case where a connection surface (divided surface in molding) 113 of separated case bodies 111, 112, for forming the air-conditioning case 11, is positioned at a portion in the guide walls 23a, 24a of the guide ditches 23, 24. In this case, circular arc portions 111a, 112a each having a radius of curvature in a range of 1–4 mm are provided at corners of the connection surface 113 in the guide walls 23a, 24a. Burrs are readily formed on the connection surface 113 of the divided case bodies 111, 112 in resin molding. Therefore, when the film member 140 is moved by the pushing force of the driving shaft 25, the free end 140c may be readily caught at the corner of the connection surface 113. However, as shown in FIG. 16, because the circular arc portions 111a, 112a are formed at the corner of the connection surface 113, it can prevent protrusions such as burrs from being formed at the corner of the connection surface 113, and it can effectively prevent the free end of the film member 140 from being caught by the connection surface 113.

Here, chamfer portions may be formed at the corner of the connection surface 113 in place of the circular arc portions 111a, 112a. Further, the third embodiment may be applied to the film member 221 of the air-outlet mode slide door 22, without being limited to the film member 140 of the slide door 14 as described above.

(Fourth Embodiment)

Figure 9:
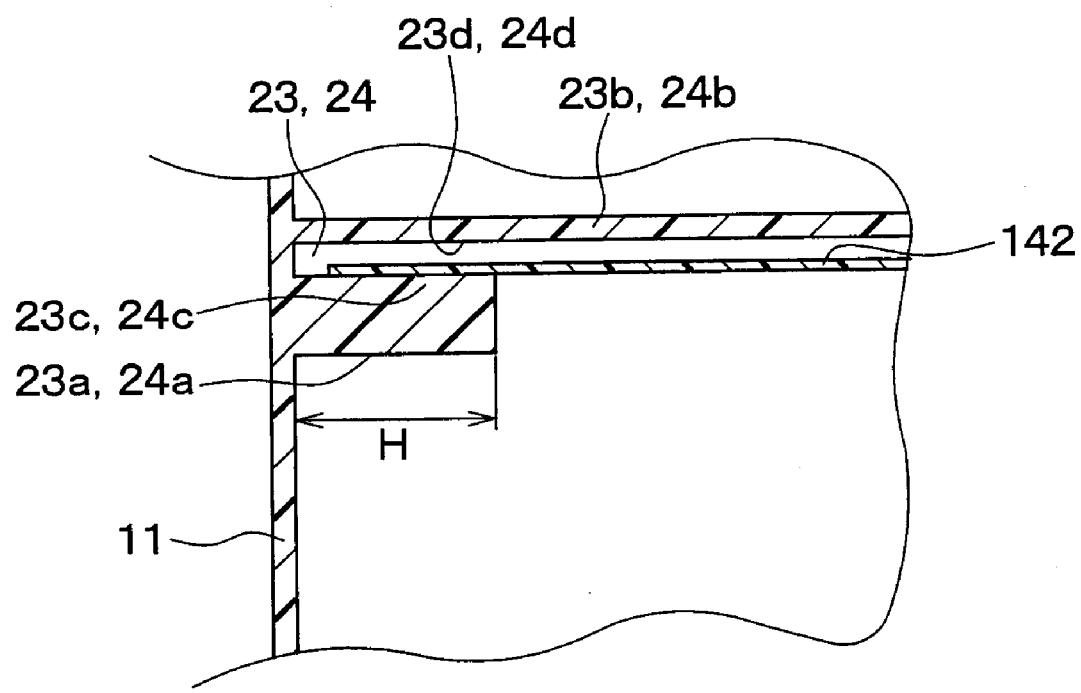
FIG. 9 is a cross-sectional view taken along line IX—IX in FIG. 1.
Figure 17:
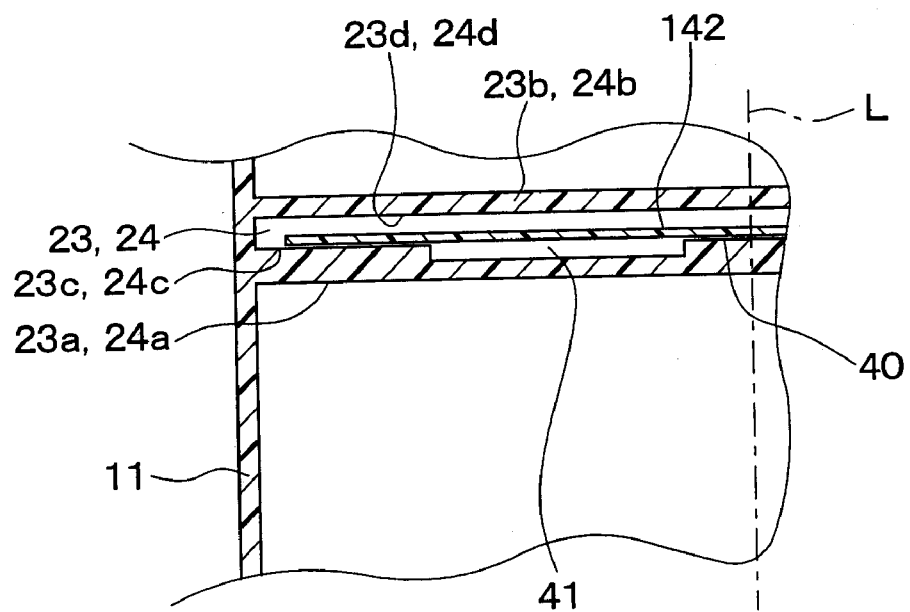
FIG. 17 is a cross-sectional view corresponding to FIG. 9, showing a main part of an air conditioning unit according to a fourth preferred embodiment of the present invention.

FIG. 17 is a cross-sectional view corresponding to FIG. 9 of the first embodiment. In the above-described first embodiment, the guide wall 23a, 24a at the upstream air side and the protrusion 23c, 24c are formed only in the range of the predetermined height of 10 mm, so that a space is provided between the guide walls 23a, 24a in the width direction of the film member 142. However, in the fourth embodiment, as shown in FIG. 17, the guide wall 23a, 24a at the upstream air side extends to the whole width of the film member 142, similarly to the guide wall 23b, 24b at the downstream air side. A center protrusion 40 is provided at a center area of the upstream side guide wall 23a, 24a in the width direction (case width direction) of the film member 142. In FIG. 17, L indicates the center line of the case 11 in the width direction. The center protrusion 40 is used as a pushing member which pushes the film member 142 to the seal surface 29 of the air conditioning case 11 in the seal portion Sa at a center area in the width direction of the film member 142. A recess portion 41 is provided between the center protrusion 40 and the left and right side protrusions 23c, 24c. Therefore, a clearance is provided between the film member 142 and upstream side guide wall 23a, 24a.

According to the fourth embodiment of the present invention, the center area of the film member 142 in the width direction can be pressed to the seal surface 29 in the seal portion Sa by the center protrusion 40. Therefore, it can prevent the center area of the film member 142 in the width direction from being greatly separated from the seal surface 29 by the bending habit and the gravity of the film member 142

In the fourth embodiment, as shown in FIG. 17, the center area of the film member 142 in the width direction is approached to the seal surface 29 by the center protrusion 40. Therefore, the clearance Cx shown in FIG. 11 can be reduced, and an air leakage due to the clearance Cx can be reduced. Further, by the pushing of the center protrusion 40, it can restrict the noise generated due to the free end 142b of the film member 142. Further, the recess portions 41 are provided between the center protrusion 40 and the left and right protrusions 23c, 24c in the width direction of the film member 142. Because the recess portion 141 is provided in the upstream side guide wall 23a, 24a, it can restrict a sliding area of the film member 142 with the upstream side guide walls 23a, 24a from being increased.

The air conditioning case 11 is readily bent in the resin molding. Therefore, the bent portion of the air conditioning case 11, formed in the resin molding, may strongly push the film member 142 to the seal surface 29 more than a necessary degree. However, in the fourth embodiment, because the recess portions 41 are provided between the center protrusion 40, and the left and right protrusion 23c, 24c in the width direction, it can restrict the film member 142 from being pushed to the seal surface 29 more than the necessary degree. In the second embodiment, the other parts are similar to those of the above-described first embodiment.

(Fifth Embodiment)

Figure 18:
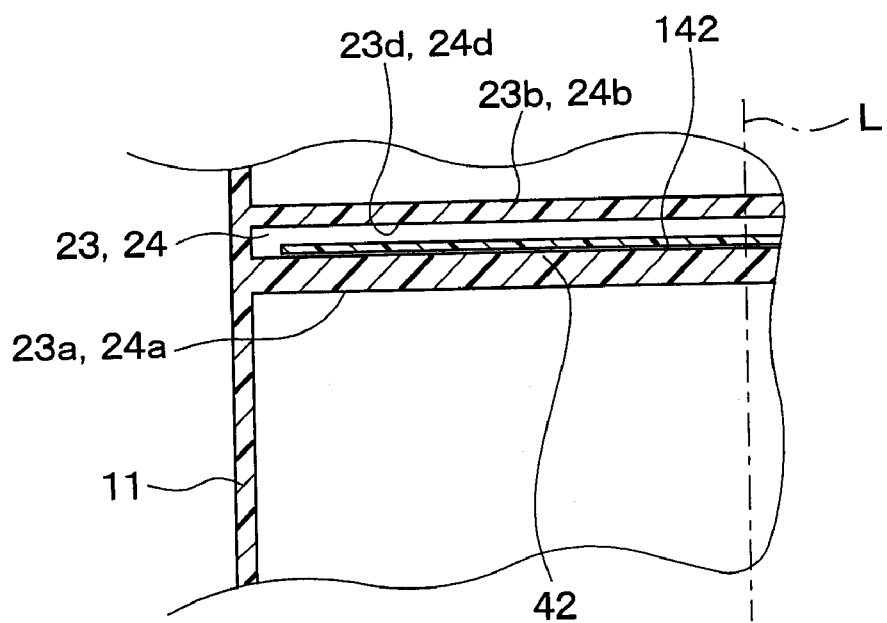
FIG. 18 is a cross-sectional view corresponding to FIG. 9, showing a main part of an air conditioning unit according to a fifth preferred embodiment of the present invention.

FIG. 18 shows the fifth embodiment. In the fifth embodiment, a protrusion 42 is provided in the upstream guide walls 23a, 24a along the entire width of the film member 142 in the width direction. That is, in the fifth embodiment, the recess portion 41 provided in the fourth embodiment is omitted, and the protrusion 42 corresponding to the center protrusion 40 and the left and right protrusions 23c, 24c of the fourth embodiment is provided in the upstream side guide walls 23a, 24a along the entire width in the width direction of the film member 142.

Figure 11:
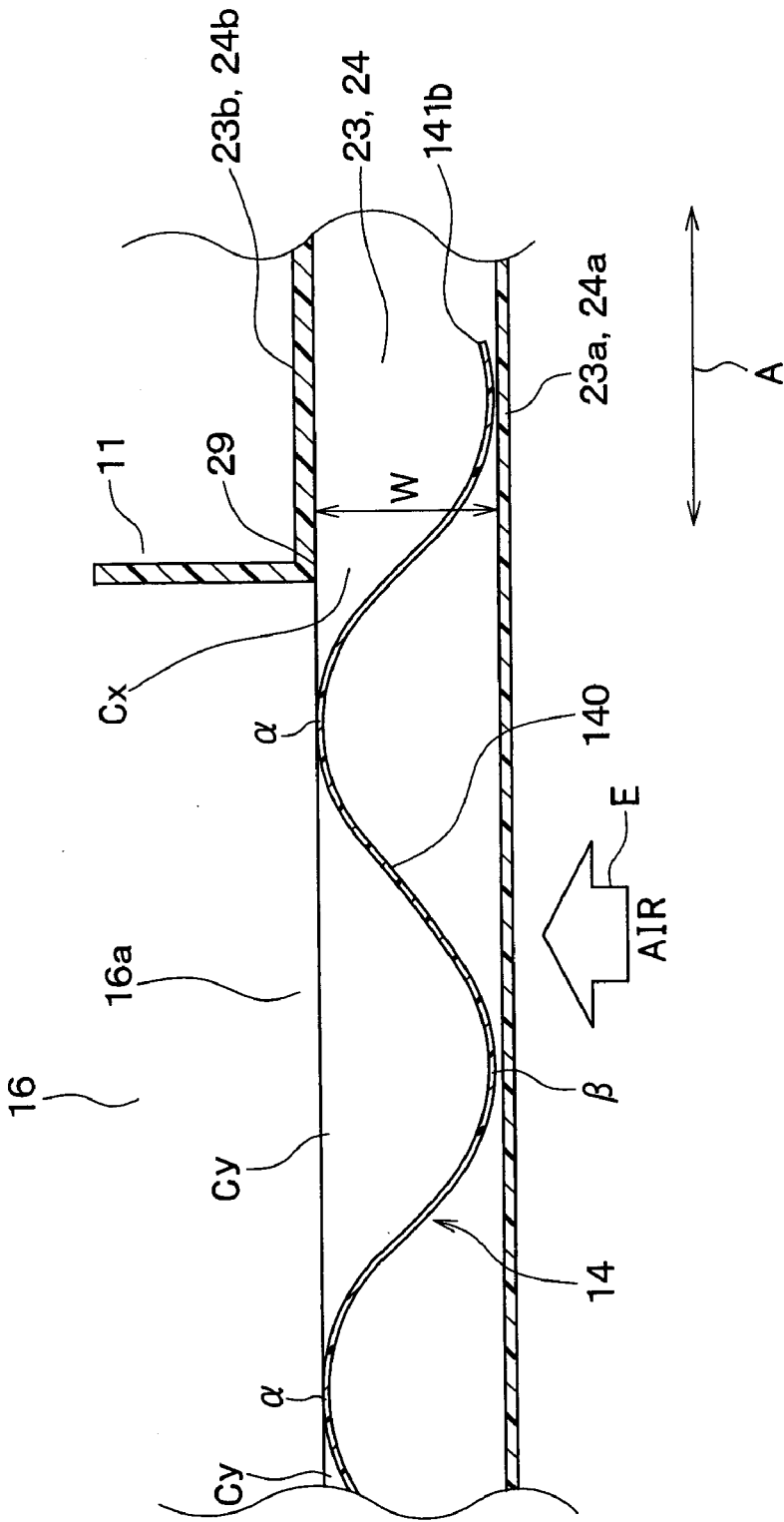
FIG. 11 is an enlarged sectional view showing a seal portion in a comparison example.

In the fifth embodiment, because all the film member 142 in the width direction of the film member 142 can be approached to the seal surface 29 by the protrusion 42, the clearance Cx in FIG. 11 can be reduced in the entire length of the film member 142 in the width direction. Accordingly, air leakage due to the clearance Cx can be reduced, and it can restrict the noise generated due to the free end 142b of the film member 142 can be restricted.

(Sixth Embodiment)

Figure 19:
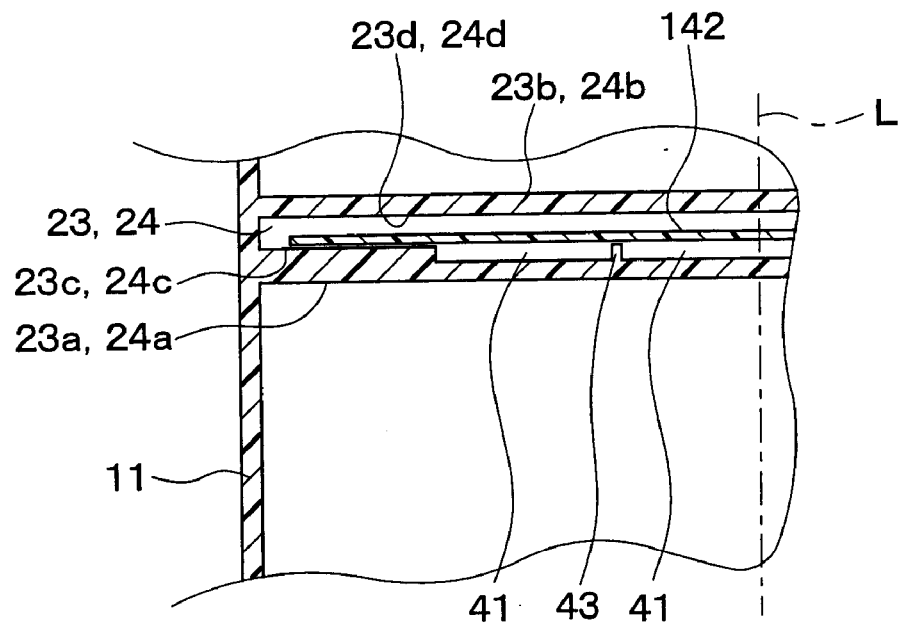
FIG. 19 is a cross-sectional view corresponding to FIG. 9, showing a main part of an air conditioning unit according to a sixth preferred embodiment of the present invention.

The sixth embodiment of the present invention will be now described with reference to FIG. 19. In the sixth embodiment, plural rib protrusions 43 are arranged in the upstream side guide walls 23a, 24a, instead of the single center protrusion of the fourth embodiment. That is, the plural rib protrusions 43 are provided in the upstream side guide walls 23a, 24a at plural positions around the center area in the width direction of the film member 142. In FIG. 19, only the left-side rib protrusion 43 at the left side of the center line L is shown. For example, in FIG. 19, a rib protrusion 43 positioned at the right side of the center line L symmetrically with the left-side rib protrusion is not shown.

Further, as shown in FIG. 19, recess portions 41 are provided between the rib protrusions 43, and between the rib protrusion 41 and the left and right protrusions 23c, 24c, in the width direction of the film member 142. Accordingly, in the sixth embodiment, advantage similar to the above-described fourth embodiment can be obtained.

(Seventh Embodiment)

Figure 20:
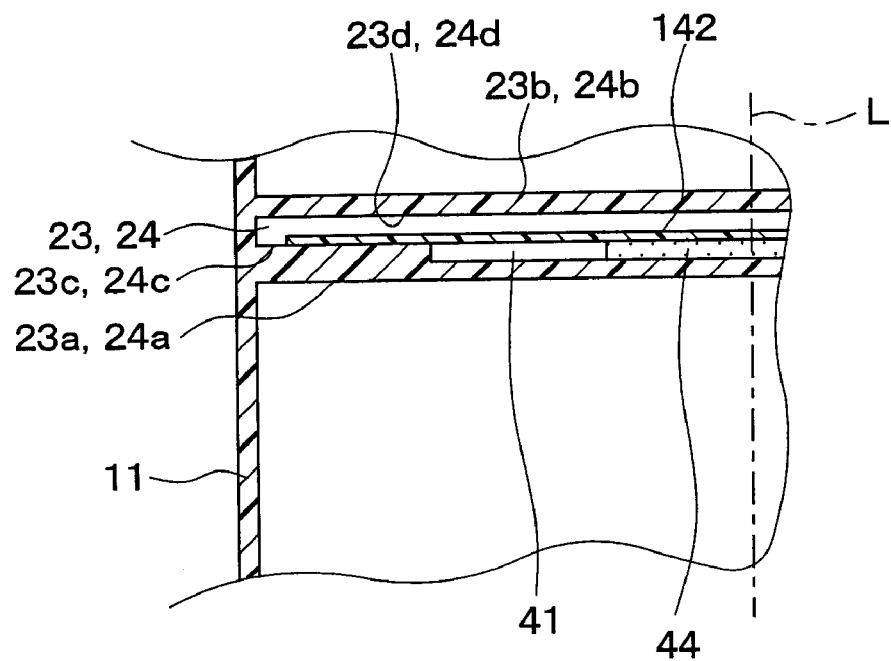
FIG. 20 is a cross-sectional view corresponding to FIG. 9, showing a main part of an air conditioning unit according to a seventh preferred embodiment of the present invention.

The seventh embodiment of the present invention will be now described with reference to FIG. 20. In the seventh embodiment, an elastic member 44 is bonded to the upstream side guide walls 23a, 24a at a center area in the width direction of the film member 142, instead of the center protrusion 40 of the above-described fourth embodiment. The elastic member 44 can be made of the same elastic material as the elastic member 143p shown in FIG. 4A. The elastic member 44 is provided to push the film member toward the seal surface by the elastic force of the elastic member 44.

Accordingly, the elastic member 44 constructs a pushing means for pushing the center portion of the film member 142 in the width direction to the seal surface in the seal portion Sa, among the seal surface 29 of the air conditioning case 11. Therefore, the seventh embodiment has the advantage similar to the above-described fourth embodiment.

Further, in the seventh embodiment, even when the clearances between the upstream side guide walls 23a, 24a and the downstream side guide walls 23b, 24b are formed with different dimensions in the resin molding, because the elastic member 44 is elastically deformed, the different of the pushing force to the film member 142 can be effectively absorbed by the elastic deformation of the elastic member 44.

A resin film material such as Polyethylene Terephthalate (PET), which is flexible and has a low frictional resistance, can be fixed to the surface of the elastic member 44 by using adhesive. In this case, the sliding performance between the surface of the elastic member 44 and the film member 142 can be improved. In FIG. 20, the protrusions 23c, 24c are provided at the left and right sides of the upstream guide walls 23a, 24a. However, when the length of the elastic member 44 in the width direction of the film material 142 is enlarged, the left and right protrusions 23c, 24c can be omitted.

(Eighth Embodiment)

Figure 21:
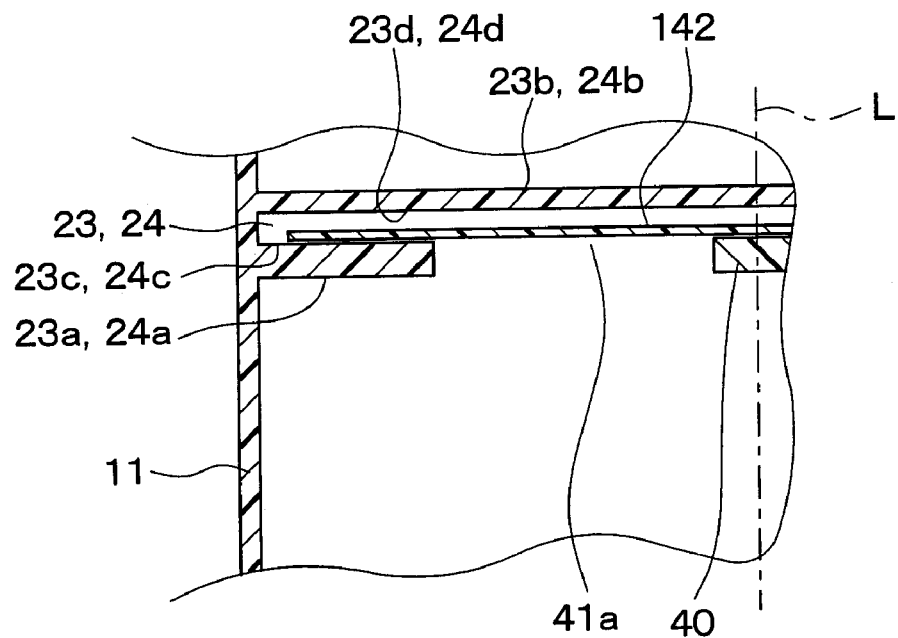
FIG. 21 is a cross-sectional view corresponding to FIG. 9, showing a main part of an air conditioning unit according to an eighth preferred embodiment of the present invention.

The eighth embodiment of the present invention will be now described with reference to FIG. 21. In the above-described fourth embodiment of the present invention, the center protrusion 40 is formed integrally with the upstream guide walls 23a, 24a. However, in the eighth embodiment, as shown in FIG. 21, the center protrusion 40 is formed separately from the upstream side guide walls 23a, 24a of the air conditioning case 11. The center protrusion 40 formed separately from the upstream side guide walls 23a, 24a of the air conditioning case 11 is fixed to the air conditioning case 11 by using an adhesive, an engagement structure, a screw member, or the like. Accordingly, in the eighth embodiment, the center protrusion 40 is constructed independently from the guide ditches 23, 24, and a space portion 41a corresponding to the recess portion 41 of FIG. 17 can be provided between the center protrusion 40 and the upstream side guide walls 23a, 24a. Therefore, similarly to the fourth embodiment, the film member 142 is pushed to the seal surface 29 by the center protrusion 40 in the door width direction. Thus, in the eighth embodiment, the advantage described in the fourth embodiment can be obtained.

The rib protrusions 43 shown in FIG. 19 of the sixth embodiment can be constructed independently from the upstream side guide walls 23a, 24a to be formed separately from the upstream side guide walls 23a, 24a.

In the above-described fourth through eighth embodiments, the present invention is typically applied to the seal portion Sa. However, the fourth through eighth embodiments can be used for the other seal portions Cb–Ch.

(Ninth Embodiment)

Figure 22:
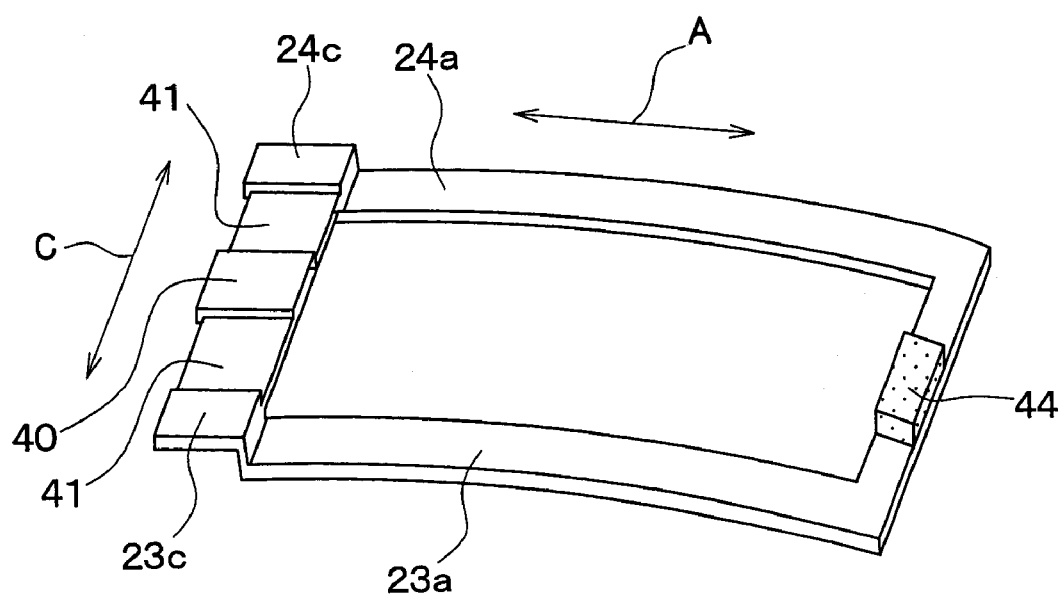
FIG. 22 is a perspective view showing a guide wall member at an upstream air side of an air passage opening/closing device, according to a ninth preferred embodiment of the present invention.

The ninth embodiment of the present invention will be now described with reference to FIG. 22. In the above-described fourth embodiment, as shown in FIG. 17, the center protrusion 40 is formed integrally with the upstream side guide wall 23a, 24a. Further, in the above-described seventh embodiment, as shown in FIG. 20, the elastic member 44 is fixed to the upstream side guide walls 23a, 24a. However, in the ninth embodiment, as shown in FIG. 22, the upstream-side guide wall member including the guide walls 23a, 24a is formed separately from the air conditioning case 11, to have a rectangular center opening.

In the upstream-side guide wall member formed separately from the air conditioning case 11, the protrusions 23c, 24c are provided at left and right positions in the door width direction, and the center protrusion 40 is provided on a center position in the door width direction, at one end in the door moving direction. Further, the elastic member 44 is fixed to the other end of the upstream-side guide wall member in the door moving direction, at a center portion in the door width direction. Then, the upstream-side guide wall member including the guide walls 23a, 24a, the protrusions 40, 41 and the elastic member 44 is fixed to the air conditioning case 11 at a predetermined position by using an adhesive, an engagement structure, a screw member or the like.

In the ninth embodiment, the upstream-side guide wall member including the guide walls 23a, 24a is formed separately from the air conditioning case 11. Therefore, the structure of the air conditioning case 11 can be made simple, and the air conditioning case 11 can be readily formed by the resin molding.

In the ninth embodiment, the rectangular center opening of the upstream-side guide wall member corresponds to the opening portion of the air conditioning case 11, such as the opening portion 150a of the warm air passage 150.

Although the present invention has been fully described in connection with the preferred embodiments thereof with reference to the accompanying drawings, it is to be noted that various changes and modifications will become apparent to those skilled in the art.

For example, in the above-described first through seventh embodiments, a pushing member for pushing the film member of the slide door can be constructed separately from the air conditioning case 11 or the upstream side guide walls 23a, 24a, as shown in FIGS. 21 and 22. Further, the protrusion height of the pushing member can be suitably changed in accordance with the bending amount of the air conditioning case 11 in each of the seal portions Sa–Sh.

In the above-described embodiments, the pushing member for pushing the film member is provided in the door width direction. However, the pushing member that pushes the film member can be set to extend in the door moving direction.

Further, in the above-described embodiments, the present invention is typically applied to the air passage opening/closing device of a vehicle air conditioner, that is, the slide door 14 and the slide door 22 of the vehicle air conditioner. However, the present invention can be applied widely to an air passage opening/closing device in various fields, without being limited to a vehicle air conditioner.

Such changes and modifications are to be understood as being included within the scope of the present invention as defined in the appended claims.

What is claimed is:

1. An air passage opening/closing device comprising:
 a case for defining an air passage through which air flows, the case having an opening portion of the air passage;
 a slide door disposed in the case to be movable in a door moving direction for opening and closing the opening portion, the slide door including a flexible film member disposed at an upstream side of the opening portion in an air flow direction, the film member having a free top end in the door moving direction;
 a driving device for moving the slide door;
 a guide member defining a guide ditch for guiding a movement of the film member, the guide member being provided in the case; and
 a pushing member that pushes the film member toward a seal surface around the opening portion of the case, the seal surface having a first surface in a direction parallel to the door moving direction, and a second surface in a direction perpendicular to the door moving direction, wherein:
 the free top end of the film member is moved forward along the guide ditch by a pushing force from the driving device to the film member; and
 the pushing member is disposed to push the film member toward the second surface such that a clearance between the film member and the second surface generally becomes smaller than a clearance between the film member and first surface.

2. The air passage opening/closing device according to claim 1, wherein the pushing member is disposed in the slide door partially at least in a center area of the slide door in the direction perpendicular to the door moving direction.

3. The air passage opening/closing device according to claim 1, wherein the pushing member is disposed in the slide door in an entire length of the slide door in the direction perpendicular to the door moving direction.

4. The air passage opening/closing device according to claim 1, wherein the pushing member is molded integrally with the case.

5. The air passage opening/closing device according to claim 1, wherein the pushing member is molded separately from the case.

6. The air passage opening/closing device according to claim 1, wherein the pushing member is made of an elastic material.

7. The air passage opening/closing device according to claim 1, wherein the pushing member is provided integrally with the guiding member.

8. The air passage opening/closing device according to claim 7, wherein the pushing member is provided in the guide member to be offset from a wall surface of the guide member toward the second surface in the seal surface, at a portion around the second surface.

9. The air passage opening/closing device according to claim 7, wherein the pushing member is disposed on a wall surface of the guide member defining the guide ditch, to reduce partially a ditch dimension in an area around the second surface.

10. The air passage opening/closing device according to claim 1, wherein the free top end of the film member is provided with a corner that has one of a circular arc shape and a chamfer shape.

11. The air passage opening/closing device according to claim 1, wherein the film member is bent at a position proximate to the free top end, to form a bent portion having a circular arc shape.

12. The air passage opening/closing device according to claim 1, wherein:
the case is disposed to accommodate a heater core for heating air to be blown into a passenger compartment of a vehicle through the air passage of the case;
the heater core is disposed in the case to define a bypass passage through which air flows toward the passenger compartment while bypassing the heater core; and
the slide door is an air mixing door that adjusts a flow ratio between an air amount passing through the heater core and an air amount passing through the bypass passage while bypassing the heater core.

13. The air passage opening/closing device according to claim 1, wherein:
the case has a plurality of outlet openings from which air is blown into a passenger compartment of a vehicle; and
the slide door is disposed to open and close the outlet openings.

14. An air-passage opening/closing device comprising:
a case for defining an air passage through which air flows, the case having an opening portion of the air passage;
a slide door disposed in the case to be movable in a door moving direction for opening and closing the opening portion, the slide door including a flexible film member disposed at an upstream side of the opening portion in an air flow direction, the film member having a free top end in the door moving direction;
a driving device for moving the slide door; and
a guide member defining a guide ditch for guiding a movement of the film member, the guide member being provided in the case, wherein:
the free top end of the film member is moved forward along the guide ditch by a pushing force from the driving device to the film member;
the case has a seal surface around the opening portion, along which the slide door moves;
the seal surface has a first surface in a direction parallel to the door moving direction, and a second surface in a direction perpendicular to the door moving direction; and
the guide ditch is provided such that a clearance between the film member and the second surface of the case is made generally smaller than a clearance between the film member and the first surface of the case.

15. The air passage opening/closing device according to claim 14, wherein the guide member is provided to be offset toward the second surface in the seal surface, at a portion around the second surface.

16. The air passage opening/closing device according to claim 14, wherein a ditch dimension of the guide ditch is partially reduced in an area around the second surface, so that the film member is approached to the second surface.

17. The air passage opening/closing device according to claim 14, wherein the guide member is provided with a pushing member for pushing the film member toward the second surface, around the second surface.

18. The air passage opening/closing device according to claim 17, wherein the pushing member pushes the film member to the second surface so that the film member directly contacts the second surface.

19. The air passage opening/closing device according to claim 14, wherein the free top end of the film member is provided with a corner that has one of a circular arc shape and a chamfer shape.

20. The air passage opening/closing device according to claim 14, wherein the film member is bent at a position proximate to the free top end, to form a bent portion having generally a circular arc shape.

21. The air passage opening/closing device according to claim 14, wherein:
the case is disposed to accommodate a heater core for heating air to be blown into a passenger compartment of a vehicle through the air passage of the case;
the heater core is disposed in the case to define a bypass passage through which air flows toward the passenger compartment while bypassing the heater core; and
the slide door is an air mixing door that adjusts a flow ratio between an air amount passing through the heater core and an air amount passing through the bypass passage while bypassing the heater core.

22. The air passage opening/closing device according to claim 14, wherein:
the case has a plurality of outlet openings from which air is blown into a passenger compartment of a vehicle; and
the slide door is disposed to open and close the outlet openings.

* * * * *